United States Patent
Matsumoto et al.

(10) Patent No.: US 7,426,540 B1
(45) Date of Patent: Sep. 16, 2008

(54) CHAT SENDING METHOD AND CHAT SYSTEM

(75) Inventors: Yasuhide Matsumoto, Kawasaki (JP); Masahiko Murakami, Kawasaki (JP); Hideto Kihara, Kawasaki (JP); Kenichi Sasaki, Kawasaki (JP); Tatsuro Matsumoto, Kawasaki (JP); Kazuki Matsui, Kawasaki (JP); Hidenobu Ito, Kawasaki (JP); Hitoshi Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/563,389

(22) Filed: Apr. 28, 2000

(30) Foreign Application Priority Data

| May 13, 1999 | (JP) | ................................. 11-133210 |
| Feb. 9, 2000 | (JP) | ............................. 2000-031714 |

(51) Int. Cl.
*G06F 15/16* (2006.01)

(52) U.S. Cl. ...................... 709/206; 709/203; 709/223; 709/224

(58) Field of Classification Search ................. 709/205, 709/206, 203, 204, 217, 218, 219, 223, 224; 345/758
See application file for complete search history.

(56) References Cited

U.S. PATENT DOCUMENTS

| 5,634,005 | A | * | 5/1997 | Matsuo ....................... 709/206 |
| 5,784,568 | A | * | 7/1998 | Needham ................... 709/234 |
| 5,793,365 | A | * | 8/1998 | Tang et al. ................. 715/758 |
| 5,802,253 | A | * | 9/1998 | Gross et al. ................ 706/47 |
| 5,812,126 | A | * | 9/1998 | Richardson et al. ........ 715/741 |
| 5,828,839 | A | * | 10/1998 | Moncreiff ................... 709/204 |
| 5,884,033 | A | * | 3/1999 | Duvall et al. ................ 709/206 |
| 5,987,503 | A | * | 11/1999 | Murakami ................... 709/204 |
| 5,990,887 | A | * | 11/1999 | Redpath et al. ............ 715/758 |
| 6,212,548 | B1 | * | 4/2001 | DeSimone et al. .......... 709/204 |
| 6,219,045 | B1 | * | 4/2001 | Leahy et al. ................ 715/757 |
| 6,366,948 | B1 | * | 4/2002 | Teibel ........................ 709/204 |
| 6,446,112 | B1 | * | 9/2002 | Bunney et al. ............. 709/204 |
| 6,484,196 | B1 | * | 11/2002 | Maurille .................... 709/206 |
| 6,584,494 | B1 | * | 6/2003 | Manabe et al. ............. 709/204 |
| 6,606,644 | B1 | * | 8/2003 | Ford et al. ................. 709/203 |
| 6,654,787 | B1 | * | 11/2003 | Aronson et al. ............ 709/206 |
| 6,735,615 | B1 | * | 5/2004 | Iwayama et al. ........... 709/204 |
| 6,785,708 | B1 | * | 8/2004 | Busey et al. ............... 709/204 |
| 6,789,901 | B1 | * | 9/2004 | Kormos ...................... 353/13 |
| 6,862,625 | B1 | * | 3/2005 | Busey et al. ............... 709/227 |
| 7,111,043 | B2 | * | 9/2006 | Kihara et al. ............... 709/204 |
| 7,185,055 | B2 | * | 2/2007 | Matsumoto et al. ......... 709/204 |

FOREIGN PATENT DOCUMENTS

JP 05-153260 6/1993

OTHER PUBLICATIONS

Oikarinen J. and Reed D. Internet Relay Chat Protocol (RFC 1459) May 1993.*

* cited by examiner

*Primary Examiner*—Lashonda T Jacobs
(74) *Attorney, Agent, or Firm*—Staas & Halsey LLP

(57) ABSTRACT

To conduct conversation without confusion in a virtual space while sharing a plurality of topics, send origin channel #CHOCOA, destination channel #meeting and message sending conditions are correlated and given to a chat server or chat client. If, for example, "USER1, USER3, USER4" are designated as sending conditions, only messages from designated users are sent from message origin channel #CHOCOA to destination channel #meeting. Meanwhile, messages from "USER1, USER3, USER4" can be displayed on message origin channel #CHOCOA or not displayed.

22 Claims, 21 Drawing Sheets

(a) #CH1 Conditions Table

| Send Origin | Destination | Sending Conditions | Display Format |
|---|---|---|---|
| #CH1 | #CH2<br>#CH3<br>#CH4 | CONTENT *<br>CONTENT #CUSTOMER*<br>NICK USER4 | Send All<br>Send Messages Beginning With #CUSTOMER |

(b) #CH1 Hop Table

| Initial Value | 20 |
|---|---|
| Reduction Value | 3 |

FIG. 2

(a)
Channel Setting Window

Please set channel.

| meeting ▼ |

[ OK ]  [ CANCEL ]

(b)
Condition Setting Window

Please set conditions for sending from #CHOCOA to #meeting.

Don't Send
Send All
Set Keyword     Keyword: [_____] —41
User Selection▶

[ OK ]  [ CANCEL ]

*FIG. 4*

(a) #CHOCOA Conditions Table

| Destination | Sending Conditions | Display Format |
|---|---|---|
| #meeting | USER1;USER3;USER4<br>(NICK USER1)or(NICK USER3)or(NICK USER4) | Send USER1, 3, 4 Messages |
| ⋮ | ⋮ | ⋮ |

(b) #meeting Conditions Table

| Destination | Sending Conditions | Display Format |
|---|---|---|
| #CHOCOA | CONTENT * | Send All |

FIG. 6

(a) #SUPPORT Conditions Table

| Destination | Sending Conditions | Display Format |
|---|---|---|
| #CUSTOMER | #CUSTOMER* | Send Messages Beginning With #CUSTOMER |

(b) #CUSTOMER Condition Table

| Destination | Sending Conditions | Display Format |
|---|---|---|
| #SUPPORT | NULL | Don't Send |

(a) #CH1 Conditions Table

| Send Origin | Destination | Sending Conditions | Display Format | Processing Conditions |
|---|---|---|---|---|
| #CH1 | #CH2<br>#CH3<br>#CH4 | CONTENT *<br>CONTENT #CUSTOMER*<br>NICK USER4 | Send All<br>Send Message Beginning with #CUSTOMER | Add Channel Name<br>Respond with Rep. Name<br>Change Font |

(b) #CH1 Hop Table

| Initial Value | 20 |
|---|---|
| Reduction Value | 3 |

FIG. 15

(a) #CH1 Conditions Table

| Send Origin | Destination | Sending Conditions | Display Format | Processing Conditions |
|---|---|---|---|---|
| #CH1 | #CH2 | CONTENT * | Send all | Add channel name |

(b) #CH2 Conditions Table

| Send Origin | Destination | Sending Conditions | Display Format | Processing Conditions |
|---|---|---|---|---|
| #CH2 | #CH1 | CONTENT * | Send all | Respond with rep. name SUPPORT |

FIG. 19

CHAT SENDING METHOD AND CHAT SYSTEM

BACKGROUND OF THE INVENTION

1. Technical Field

The present invention relates to a technology for supporting communication by users who share a virtual space established on a network with other users (hereinafter simply "virtual space") and enabling simultaneous chatting.

2. Description of Related Art

In the present invention "chat system" refers to a system in which a plurality of users share a virtual space, and can send and receive character messages (hereinafter "messages") in essentially real time, and which can display the aforesaid sent and received messages.

"IRC (Internet Relay Chat) system" refers to a chat system based on the IRC protocol (RFC 1459) and consisting of IRC servers and IRC clients. An IRC server broadcasts messages from IRC clients to other IRC clients within a channel. An IRC client sends and receives messages to other IRC clients via an IRC server.

"Channel" in an IRC system refers to a virtual space shared by IRC clients. "Nickname" in an IRC system refers to an identifier for uniquely specifying a user. "Topic" refers to the subject of conversation on each channel. "Mode" refers to characteristics of the channel.

Conventionally, various types of chat systems have been provided in which a plurality of users share a virtual space and can simultaneously chat using text. One example is the IRC system. In the IRC system a channel is formed for each subject of conversation, known as a topic. Users participate in a channel that has a topic of interest, and chat among themselves about the topic. Messages to a channel are made by inputting a character message and pressing the return key. Character messages expressed by oneself and other IRC clients are displayed on a display.

Other systems in which a plurality of users share a virtual space and can communicate are party line services on a telephone network and mailing systems. In a party line service three or more users share a virtual space on a telephone network and can chat in real time in the same manner as IRC. In a mailing system, electronic mail to a mailing list is simultaneously allotted to a plurality of mail addresses. The plurality of mail addresses share a virtual space represented by a mailing list.

However, in an IRC system, when the number of users participating in a channel becomes numerous, there is often a plurality of subjects of conversation progressing simultaneously in the same channel. In this case messages regarding different subjects of conversation are displayed mixed together, and the conversation becomes confused. Also, users may be inconvenienced by the fact that in IRC at present, messaging is always limited to a single (current) channel.

For example, the following sort of situation occurs. Fifty researchers in a certain research department are participating in channel #CH1. Group A and Group B within the research department are studying the same theme. The researchers within each group want to chat about research within their own group. Also, other researchers want to chat in channel #CH1 so that they can see the chat contents. However, if two conversations proceed in parallel in the same channel, they are displayed mixed together on the display, and the conversation becomes confused. The same sort of problem occurs in other chat systems too.

Meanwhile, a separate Group C within the same research department decides to meet in channel #meeting. In order to advance the meeting contents, Group C wants Group D, which is participating in a separate channel called #LAB, to also participate in meetings. However, in conventional chat systems, both Groups C and D cannot share a chat on channel #meeting unless users within Group D voluntarily participate in channel #meeting. Moreover, since users in Group D may be absent or such, it is difficult for a plurality of users to participate in channel #meeting together.

Also, the following sort of needs occur, for example. On channel #TALK, users who have received permission to participate by paying a fee chat with celebrities such as artists or athletes and the like. The administrator of channel #TALK wants to let the contents of channel #TALK flow to an ordinary channel for a specified period of time as a commercial for the chat on channel #TALK.

In addition, if user support is provided using a chat system such as IRC, etc., all support personnel need to participate on one support channel. But if a plurality of support personnel respond to an inquiry from one questioner, the questioner may get a different responder to each question. This is very troublesome to the questioner. In order to avoid this, the responses from a plurality of support personnel should be displayed to the user as responses from one support person at most.

Furthermore, an existing support system that uses the telephone is a system in which a plurality of support personnel are waiting by the phone and respond to inquiries. However, with the telephone, when a single responder cannot answer, it is impossible to give the questioner the impression that responses from a plurality of responders are responses from one responder at most. And in mailing systems, even if responses from a plurality of responders are created by electronic mail to seem to be responses from one responder, the questioner cannot receive responses to questions in real time.

SUMMARY OF THE INVENTION

In response to the foregoing needs, an object of the present invention is to provide technology for sharing and segregating communications in a virtual space so that a plurality of users sharing a virtual space for simultaneous text-based communication may converse without confusion while sharing a plurality of topics.

In order to resolve the aforesaid problems, in a first aspect, the invention in the present application provides a chat sending system used in a communication system in which users share the same network and can chat, and for content display of chat on the network, comprising the steps of:

A: Preparing the sending conditions for sending a message on a first network to the aforesaid second network, B: Deciding, when a message occurs on the aforesaid first network, whether or not to send the aforesaid message to the aforesaid second network based on the aforesaid sending conditions, and C: Sending the aforesaid message to the second network in accordance with the aforesaid decision so that any first network message matching the aforesaid sending conditions is displayed as chat contents of the aforesaid second network.

"Network" here refers to a space in a communications network virtually shared by a plurality of users via communication means as in a chat system channel, for example.

This shall be explained with the IRC system as an example. For example, the destination of a message originating on channel #CH1 is channel #CH2. The sending condition is the keyword "#CUSTOMER*." When a message occurs on channel #CH1, a decision is made as to whether or not it includes "#CUSTOMER*." If it is included, the message that occurred is sent to channel #CH2. Therefore, of the various messages on channel #CH1, only messages that include the specified keyword "#CUSTOMER*" are sent to channel #CH2.

The present invention in a second aspect is a chat system in which information terminals mutually share the same network and can chat, and for content display of chat on the network, comprising a condition table and decision means and sending means.

The condition table correlates and stores sending conditions for sending a first network's messages to the aforesaid second network. The decision means decides, when a message occurs on the first network, whether or not to send it to the second network based on the condition table. The sending means sends the message to the second network in accordance with the aforesaid decision so that first network messages that match the sending conditions are displayed as chat contents of the second network.

Once again this shall be explained with the IRC system as an example. An IRC server has a condition table, decision means, and sending means. The IRC server stores the specified channel information and condition table for each channel. Each channel's condition table correlates the destination of messages occurring on that channel with the sending conditions. Each time a message occurs on a channel, the decision means decides whether or not the message matches the sending conditions in the condition table. If it decides there is a match with the sending conditions, the sending means sends the message to the destination channel. If the user participates in the destination channel, the user sees only specified messages, and confused chatting is prevented.

The invention in a further aspect is that of the foregoing second aspect, and further comprising setting means for receiving settings for conditions for sending messages between the aforesaid networks and for registering them in the condition table.

For example, an IRC client is provided with setting means. The setting means receives settings for the message sending origin channel, the destination channel, and sending conditions. If the IRC server has a condition table, the IRC client describes the setting information in a setting command of specified format, and sends it to the IRC server. The IRC server analyzes the command and updates the condition table. However, setting commands are prepared in advance. If the IRC client has a condition table, the setting means writes the setting information to the condition table.

In a yet further aspect, the present invention is that in the second aspect as above, while providing a chat system wherein the sending condition is an indicated keyword being included in a message.

Consider a case in which the keyword "#CUSTOMER*" is registered in the condition table's sending conditions. If there is a message beginning with the character string "#CUSTOMER," the decision means decides to send that message to the correlated destination channel.

In a yet further aspect, the present invention is that in the foregoing second aspect, while providing a chat system wherein the sending condition is a message from an indicated information terminal.

For example, nicknames "user-A; user-B" are registered in the condition table's sending conditions. If there is a message from "user-A" or "user-B," the decision means decides to send the message.

The invention in a still further aspect is that as in the above-described second aspect, while providing a chat system wherein holding score and a holding score reduction value are set for messages in each network, and the sending condition is a reference value's being equaled or exceeded by holding score arrived at by reducing the holding score of messages only by said reduction value.

For example, 1) messages on channel #CH1 are set for 20 holding score and a reduction value of 15 points, and 2) the reference value is set as 0 points in the condition table's sending conditions. When there is a message on channel #CH1, the decision means finds the holding score if the message is sent to another channel. The holding score are 20-15=5 points, so the decision means decides to send the message. Also, if the holding score of a message sent from another channel to channel #CH1 are 10 points, reducing it by 15 points puts it below the reference value. In this case, the decision means decides not to send the message.

In another aspect, the present invention is as in the foregoing second aspect, while providing a chat system wherein the aforesaid sending condition is a message within an indicated time period.

For example, the time period from Year A Month A Hour A to Year B Month B Hour B is registered in the condition table. If a message occurs within the aforesaid period, the decision means decides to send the message.

In still another aspect, the invention is as in the foregoing second aspect, while providing a chat system wherein indication of a message's send origin and destination are included in the aforesaid sending conditions. For example, it is a chat system in which a user can indicate the send origin and destination channel.

In a further aspect, the present invention as described in this application is that of the previously described second aspect, further comprising a processing condition table for storing processing conditions for messages sent from the first network to the second network, and processing means for processing the messages sent in accordance with the processing conditions.

For example, when a message is sent from channel #CH1 to channel #CH2, the processing means adds the channel name #CH1 to the message's header. On the other hand, when a message is sent from channel #CH2 to channel #CH1, the processing means changes the nicknames of all of the message originators to "SUPPORT".

The invention in a yet further aspect is that of the previously described second aspect, further comprising a process-setting means for receiving settings for message processing conditions and for storing them in storage means. This makes it possible for the user to indicate the processing conditions.

The invention in a still further aspect is that of the above-described second aspect, providing a chat system wherein the information terminal comprises output means for outputting conditions for sending messages between said networks.

The output means can be provided in the IRC client, for example. If the condition table is in the IRC server, the output means acquires the contents of the aforesaid condition table from the IRC server and stores them. What w is acquired are the contents of the condition tables for channels in which the IRC client participates. According to those settings, the output means displays the relationships between channels in the channel window that displays participating channels, or displays the sending conditions. For example, suppose all messages from channel #CH1 to channel #CH2 are sent. The output means displays "#CH1→#CH2" in the channel window. If the arrow is clicked, the output means displays a balloon displaying "all messages".

If the condition table is in the IRC client, the output means writes and outputs condition table contents related to participating channels from the condition table.

In yet a different aspect, the present invention is an signal distribution device for broadcasting messages from chat devices mutually sharing the same network and capable of chatting, and for content display of chat on the network to other chat devices within the network, comprising a condition table and decision means and sending means.

The condition table correlates and stores sending conditions for sending a first network's messages to the aforesaid second network. The decision means decides, when a message occurs on the first network, whether or not to send the aforesaid message to the second network based on the aforesaid condition table. The sending means sends the aforesaid message to the second network in accordance with the aforesaid decision so that any aforesaid first network message that match the aforesaid sending conditions is displayed as chat contents of the aforesaid second network.

This is an IRC server wherein the condition table, decision means, and sending means are provided in the IRC server. This has the same operational effects as does the invention in the above-described second aspect.

In still a different aspect, the present invention is a chat device for mutually communications by sharing the same network, and for content display of chat on the network, comprising a condition table and decision means and sending means.

The condition table correlates and stores sending conditions for sending a first network's messages to the aforesaid second network. The decision means decides, when a message occurs on the aforesaid first network, whether or not to send the aforesaid message to the aforesaid second network based on the aforesaid condition table. The sending means sends the aforesaid message to the second network in accordance with the aforesaid decision so that any aforesaid first network message that matches the aforesaid sending conditions is displayed as chat contents of the aforesaid second network.

The condition table, decision means, and sending means are provided in the IRC client. This has the same operational effects as does the invention in the above-described second aspect.

In yet another aspect, the present invention provides a computer readable storage medium storing a chat control program used in an signal distribution device for broadcasting messages from chat devices mutually sharing the same network and capable of chatting, and for content display of chat on the network to other chat devices within said network, which executes the following steps A through C.

A: A step for correlating and storing sending conditions for sending a first network's messages to a second network, B: A step for deciding, when a message occurs on the aforesaid first network, whether or not to send the aforesaid message to the aforesaid second network based on the aforesaid condition table, and C: A step for sending the aforesaid message to the second network in accordance with the aforesaid decision so that the aforesaid first network messages matching the aforesaid sending conditions are displayed as chat contents of the aforesaid second network.

This is an IRC server wherein the condition table, decision means, and sending means are provided therein. This has the same operating effect as the aforesaid second invention and ninth invention. Examples of the storage medium include computer read-/write-able floppy disks, hard disks, semiconductor memories, CD-ROM, DVD, magneto-optical disks (MO), etc.

The invention in still another aspect provides a computer readable storage medium storing a chat control program used in chat devices mutually sharing the same network and capable of chatting, and for content display of chat on the network, which executes the following steps A through C.

A: A step for correlating and storing sending conditions for sending a first network's messages to the aforesaid second network, B: A step for deciding, when a message occurs on the aforesaid first network, whether or not to send the aforesaid message to the aforesaid second network based on the aforesaid condition table, and C: A step for sending the aforesaid message to the second network in accordance with the aforesaid decision so that any aforesaid first network messages matching the aforesaid sending conditions are displayed as chat contents of the aforesaid second network.

The condition table, decision means, and sending means are provided in the IRC client. This has the same operational effects as does the invention in the above-described second aspect and that including the process-setting means. Examples of the storage media likewise as listed previously.

The invention in an even further aspect provides a transmission medium for transmitting the chat control program stored on the storage medium in accordance with the foregoing aspect of the invention describing a computer readable storage medium storing a chat control program used in an signal distribution device. Examples of this transmission medium include transmission media (optical fiber, wireless circuits, etc.) in computer network systems (LAN, Internet, wireless communication network) for propagating and supplying program information as a carrier.

In one further aspect, the present invention provides a transmission medium for transmitting the chat control program stored on the storage medium in accordance with the foregoing aspect of the invention describing a computer readable storage medium storing a chat control program. Examples of this transmission medium include the same ones listed previously.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 2 is a diagram schematically illustrating channel correlation information, wherein (a) is a diagram schematically illustrating a conditions table, and (b) is a diagram schematically illustrating a hop table;

FIG. 4 is an explanatory diagram showing one example of a setting window, wherein (a) is an example of a "channel setting window," and (b) is an example of a "conditions setting window;"

FIG. 6 is a diagram schematically illustrating destination channel condition tables correlated with send origin channels;

FIG. 8 is a diagram schematically illustrating destination channel condition tables correlated with send origin channels;

FIG. 15 is a diagram schematically illustrating channel correlation information (process conditions), wherein (a) is a diagram schematically illustrating a conditions table, and (b) is a diagram schematically illustrating a hop table;

FIG. 19 is examples (a), (b) of channel correlation information wherein messages shown in FIG. 17 are processed;

DETAILED DESCRIPTION OF THE PREFERRED EMBODIMENTS

Next, a communication (chat) system of present invention shall be explained in detail with embodiments.

First Embodiment

Figure 1:
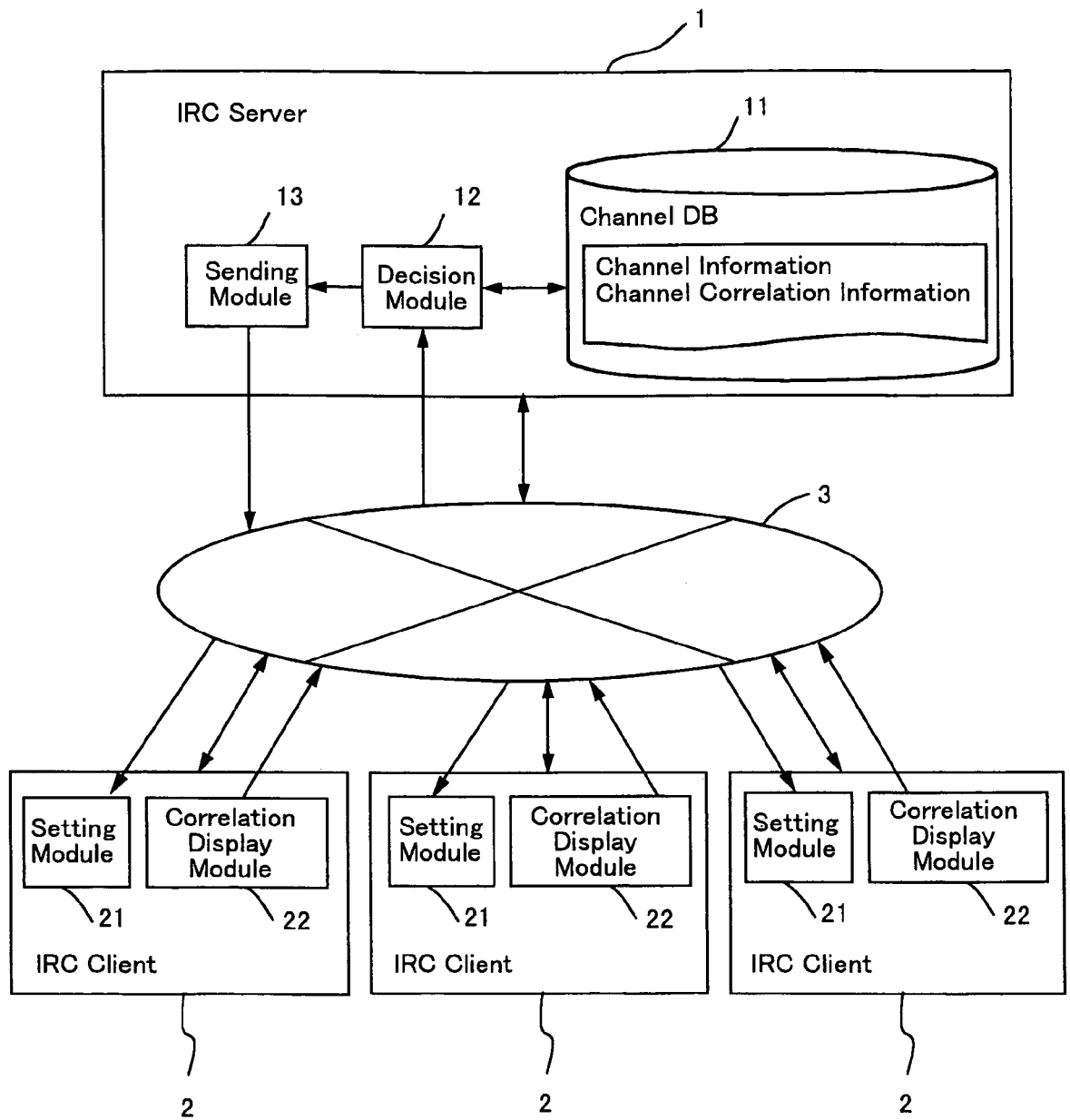
FIG. 1 is an overall structural view of a chat system in accordance with the first embodiment of the present invention.

FIG. 1 shows an overall structural view of a chat system in accordance with the first embodiment of the present invention. FIG. 1 shows an example in which the chat system of the present invention is realized using an IRC system. An IRC system is constituted so that an IRC server 1 and a plurality of IRC clients 2 are connected via Internet 3. The IRC server 1 broadcasts messages from each IRC client 2 to other IRC clients 2 within the same channel. Also, the IRC server 1 manages the specified channel information for each channel in the channel DB 11. Channel information specifically includes the channel name, topic, users participating in the channel and departed users, mode, channel administrator, etc. The IRC server 1 manages the channel information and reports specified channel information to the IRC client 2. The IRC client 2 sends and receives messages on participating channels. The IRC client 2 also holds specified channel information reported from the IRC server 1. The channel information held by the IRC client 2 includes the channel name, topic, users participating in the channel and departed users, etc.

Server

In this embodiment, the IRC server 1 also manages channel correlation information in the channel DB 11 as well as the aforesaid channel information. The IRC server 1 also has a decision part 12 and a sending part 13.

FIG. 2 is a diagram schematically illustrating the channel correlation information held in the channel DB 11. The IRC server 1 has the condition table and hop table for each channel as channel correlation information. FIG. 2(a) is a diagram schematically illustrating the condition table for an optional channel #CH1. The condition table correlates and stores the name of the destination channel where messages made within channel #CH1 are sent, the sending conditions, and display format. The display format is the format when visually outputting the sending conditions. When sending conditions are displayed on a display as described later, the sending conditions are displayed in the format indicated by the display format. If a display format is not indicated, the indicated sending conditions are displayed as is.

In this embodiment the sending conditions can be designated as 1) don't send, 2) send all, 3) keyword, 4) nickname. For example, if "NULL" is designated in the sending conditions, none of the messages on channel #CH1 are sent to the corresponding destination channel. If "CONTENT*" is designated in the sending conditions, all of the messages on channel #CH1 are sent to the corresponding destination channel. In FIG. 2, all of the messages on channel #CH1 are sent to destination channel #CH2. Also, so-called normal characters should be used when indicating the sending conditions.

If "keyword" is designated in the sending conditions, messages that include the indicated keyword are sent to the corresponding destination channel. In FIG. 2, "CONTENT #CUSTOMER*" is designated in the sending conditions for sending to destination channel #CH3. Therefore, of the messages on channel #CH1, messages beginning with "#CUSTOMER" are sent to channel #CH3.

If "nickname" is designated in the sending conditions, messages from a user with a specified nickname are sent to the corresponding destination channel. In FIG. 2, "NICK USER4" is designated in the conditions for sending to destination channel #CH4. Therefore messages from the user with the nickname "USER4" are sent to channel #CH4.

Furthermore, it is possible to select and combine a plurality of the aforesaid sending conditions. In this embodiment messages are sent by combining the aforesaid sending conditions with the number of reductions set in the hop table. Also, the sending conditions are not limited to the aforesaid conditions. For example, it is possible to designate a period of time, and to send messages that occur within the designated period of time.

FIG. 2(b) is a diagram schematically illustrating the hop table for channel #CH1. The initial value for the number of hops on channel #CH1 and the reduction value for the number of hops are set in the hop table. In this embodiment there is a hop table for each channel. Here the number of hops is the message holding score, which is reduced each time it is sent just by the set reduction value. When channel #CH1 is where a message originates, the message's new number of hops is the value after the reduction value is subtracted from the initial value. When the new number of hops falls below the specified reference value, the IRC server 1 does not send the message. This prevents communication traffic from increasing excessively, even if there are many destination channels that match the sending conditions. In this embodiment the reference value is 0 points. The reduction value for the number of hops and the reference value can also be designated as sending conditions.

In the aforesaid channel correlation information, the contents of the condition table are set based on a specific setting command sent from the IRC client 2. The setting command shall be described later. In this embodiment the contents of the hop table are set automatically by the IRC server 1 in accordance with channel creation. It is permitted for a specified user—for example, the channel administrator—to be able to set the hop table.

The decision part 12 decides, based on the aforesaid condition table, whether or not to send a message that occurs on a channel to another channel. When the decision part 12 decides to send, the message contents and the destination channel name are reported to the sending part 13. Also, the decision part 12 receives condition table setting commands from the IRC client 2 and updates the condition table. In addition, if changes occur in The IRC client 2 constituting the channels, or if channel correlation information changes, the decision part 12 reports the correlation information to the relevant channel's IRC client 2 via the sending part 13.

Sending part 13, in accordance with reports from the decision part 12, sends the reported message contents to the destination channel. Sending part 13 also reports channel correlation information to The IRC client 2 in accordance with reports from the decision part 12.

IRC Client

The IRC client 2 in FIG. 1 includes a setting part 21 and an correlation display part 22. The setting part 21 receives the settings for the aforesaid channel correlation information, and sends setting contents to the IRC server 1.

The correlation display part 22 receives and stores, in addition to specified channel information, participating channels' channel correlation information received from the IRC server 1. Also, the correlation display part 22 controls the display of received channel correlation information.

Screen (1) Settings for Channel Correlation Information

Figure 3:
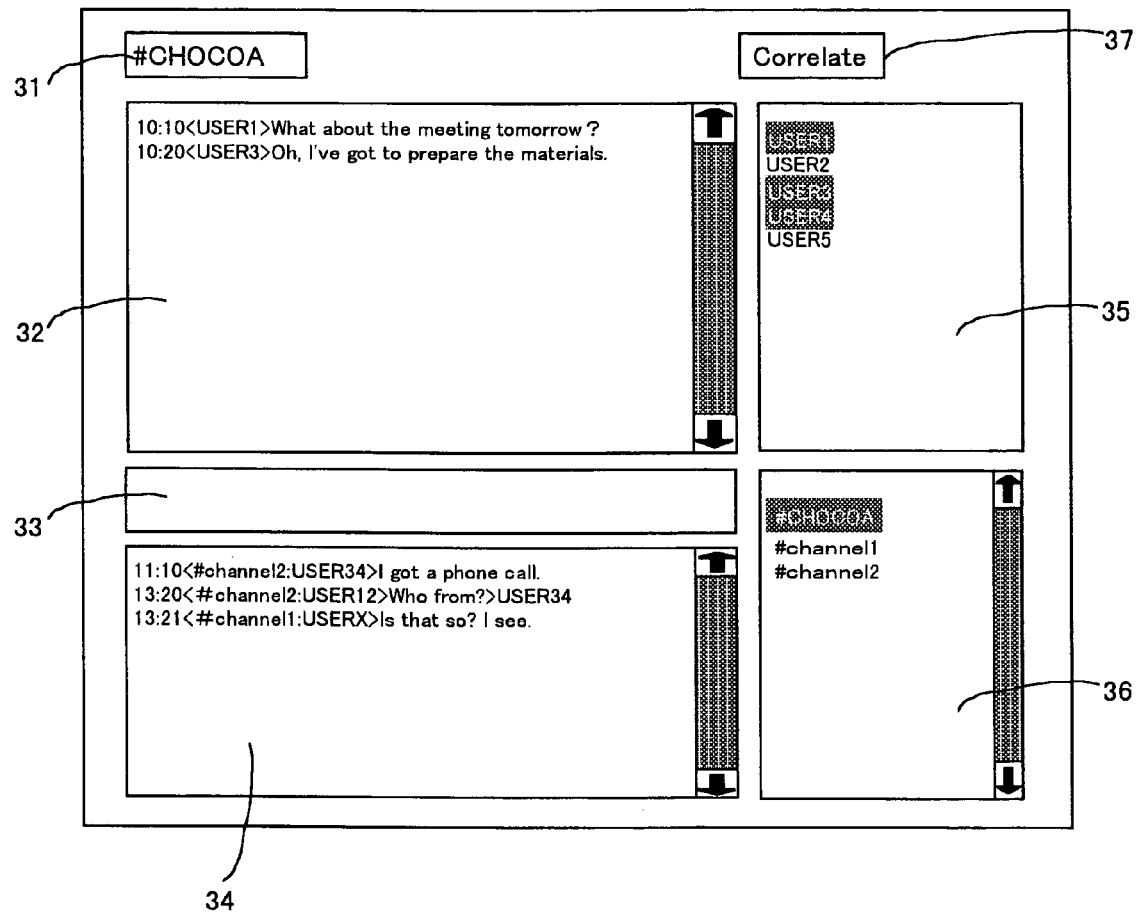
FIG. 3 is an explanatory diagram showing one example of a chat screen before setting a destination.

Next, an example of the screen that receives the aforesaid channel correlation information shall be explained. FIG. 3 is one example of a chat screen, before setting destinations, displayed by the IRC client 2. Displayed on the screen are a main channel window 31, a main chat window 32, an input window 33, a sub-chat window 34, a user window 35, and a channel window 36. These windows are the windows displayed by the usual IRC client 2. The main channel window 31 displays the channel where users are currently making messages (hereinafter simply "main channel"). The main chat window 32 displays messages on the main channel. The input window 33 receives input for messages to the main channel. The sub-chat window 34 displays messages from channels other than the main channel which are channels in which the IRC client 2 is participating (hereinafter "sub-channels"). The user window 35 displays the nicknames of users participating in the main channel. The channel window 36 displays the names of channels in which the IRC client 2 is participating. At present, users USER1 through 5 are participating in main channel #CHOCOA. The sub-channels are #channel 1 and #channel 2.

In addition to the aforesaid windows, the setting part 21 also displays an correlation button 37. When the correlation button 37 is pressed, the setting windows shown in FIGS. 4(a) and (b) are displayed. In this example USER 1, USER3, and USER4 are selected in the user window 35 and then the correlation button 37 is pressed.

FIG. 4(a) shows an example of the "channel setting window." In the "channel setting window" a user sets the channel to which to send messages on the main channel. A new channel can be set as the destination channel. The destination channel can also be selected from among existing other channels such as sub-channels, etc. FIG. 4 shows a case in which a new channel #meeting is created and set as the destination channel. When a channel name is set in the channel setting window and the "OK button" is pressed, the condition setting window of FIG. 4(b) is displayed.

FIG. 4(b) shows an example of the "condition setting window." In the "condition setting window" one sets the conditions for sending messages from main channel #CHOCOA to channel #meeting. In this embodiment the sending conditions that may be selected are "don't send," "send all," "set keyword," and "user selection." A plurality of these conditions may be selected and combined. Each condition corresponds to a sending condition that can be set in the aforesaid condition table. If a user is already selected in user window 35, it can be made impossible to select "don't send" and "send all."

If "set keyword" is selected, the cursor blinks and accepts input in a keyword box 41 for inputting keywords. This can happen if either "user selection" is selected in the "condition setting window" or if a user is selected in the user selection window in the aforesaid FIG. 3. It should be such that if "user selection" is selected in the "condition setting window," the list of users constituting main channel #CHOCOA is displayed and user selection can be accepted.

When the "OK button" in FIG. 4 is pressed, the setting command is sent from the IRC client 2 to IRC server 1. The setting command describes the send origin channel, destination channel, and sending conditions. In the FIG. 4 example, conditions other than the users indicated in the aforesaid FIG. 3 are not set. Here is an example of the setting command in this case.

"CREATESUB #CHOCOA #meeting NICK (USER1, USER3,USER4)"

The aforesaid setting command is a setting command that creates the new channel #meeting and sends messages by "USER1," "USER3," and "USER4" from channel #CHOCOA to channel #meeting. Also, if channel #meeting is an existing channel, the following setting command is sent to the IRC server 1.

"RELATION #CHOCHOA #meeting NICK (USER1, USER3,USER4)"

The aforesaid setting command is a setting command that designates channel #CHOCOA as the send origin and existing channel #meeting as the destination, and sends messages from "USER1," "USER3," and "USER4" from channel #CHOCOA to channel #meeting. The IRC client 2 of USER1, which sent the setting command, displays a screen like that shown in FIG. 5.

Figure 5:
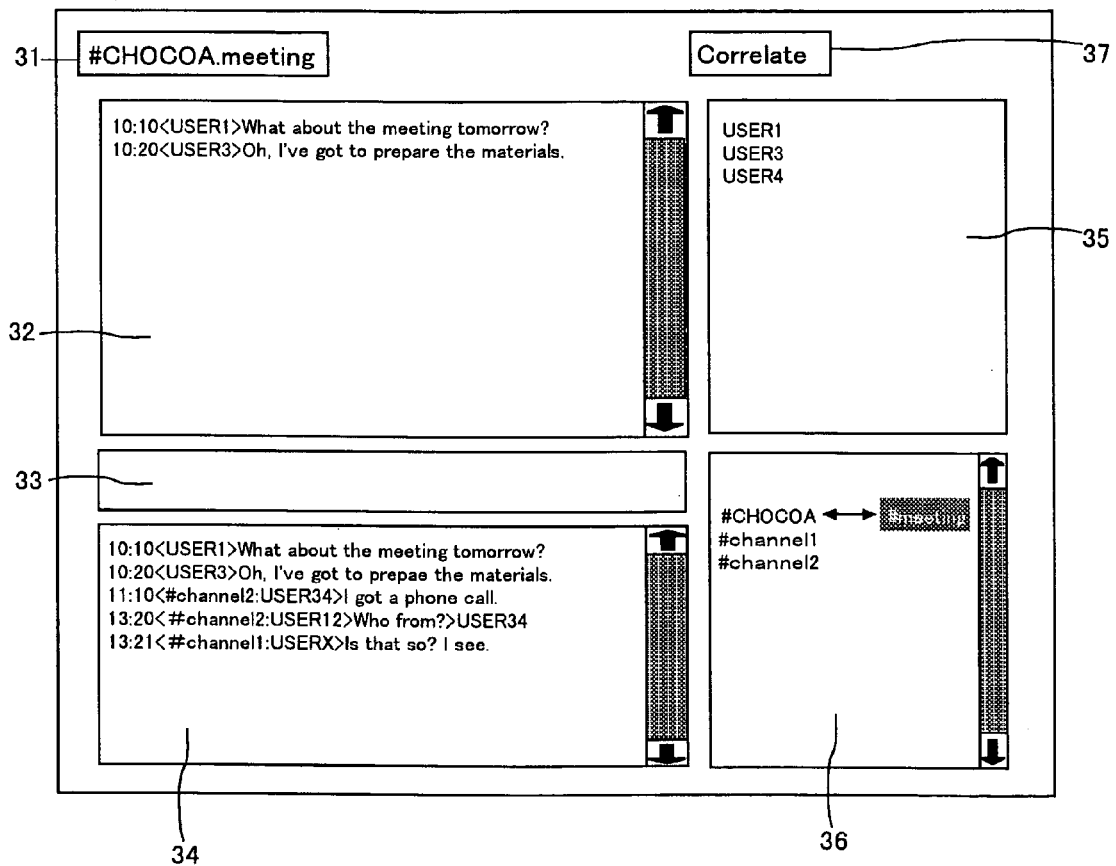
FIG. 5 is an example of a screen for destination channels.

FIG. 5 is an example of the screen at channel #CHOCOA's destination channel #meeting. The main channel window 3 displays #CHOCOA.meeting as the main channel. This shows that it is #CHOCOA's destination channel. The main chat window 32 displays messages in channel #meeting. The condition for sending from sending origin channel #CHOCOA is "user selection," so only messages from designated users are displayed in the main chat window 32. Also, the user window 35 displays the nicknames of users constituting channel #meeting. In the sub-chat window 34, the contents of messages made in channel #meeting are displayed as messages on channel #CHOCOA. This shows that messages on channel #meeting are being sent to channel #CHOCOA.

FIG. 6 is a diagram schematically illustrating the condition tables for the aforesaid channels #CHOCOA and #meeting. FIG. 6(a) is the condition table for send origin channel #CHOCOA created in response to the aforesaid setting command. Channel #meeting is registered as the destination. Also, the user nicknames selected in the user window 35 in FIG. 3 are described as conditions for sending to channel #meeting. "Send USER1,3,4 messages" is designated as the display format for sending conditions.

FIG. 6(b) is the condition table for newly created channel #meeting. In this example channel #CHOCOA is set as the destination and "CONTENT*" is set as the sending condition. Therefore all messages on channel #meeting are sent to channel #CHOCOA. The display format is designated as "send all." The setting for conditions for sending from channel #meeting to channel #CHOCOA can be in accordance with user indications, or a default value can be automatically set in accordance with conditions for sending from #CHOCOA to #meeting. For example, if the users constituting channel #CHOCOA are designated and channel #meeting is created, the default value for the conditions for sending from channel #meeting to channel #CHOCOA is "CONTENT*."

Next, a case in which "set keyword" is selected in the "condition setting window" shall be explained. Furthermore, in order to simplify the explanation, channel #CUSTOMER is set as the destination for channel #SUPPORT. Also, the users constituting send origin channel #SUPPORT are named SUPPORT1,2,3. When a user inputs the keyword "CUSTOMER*" in the keyword box 41 and presses the "OK button," the screen shown in FIG. 7 is displayed.

Figure 7:
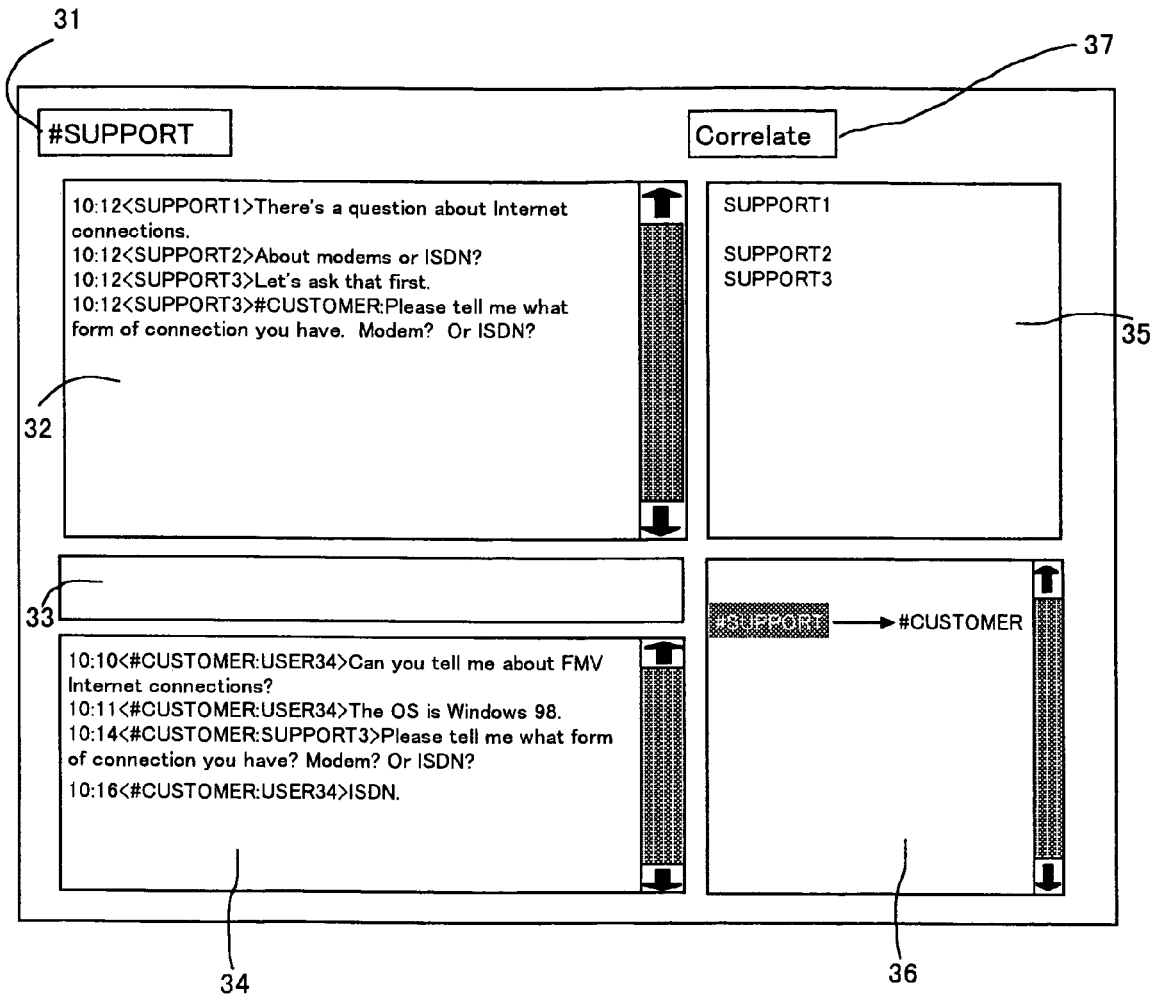
FIG. 7 is an explanatory diagram showing an example of the display when sending messages based on keywords.

FIG. 7 is a diagram explaining a display example of sending messages based on keywords. In this channel screen, send origin channel #SUPPORT is the main channel. Of the messages on channel #SUPPORT, those beginning with the keyword "#CUSTOMER" are sent to channel #CUSTOMER. For example, in the main chat window 32 "SUPPORT3" makes a message beginning with the keyword "#CUSTOMER." This message is displayed in the sub-chat window 34 as a message by channel #CUSTOMER. Doing it this way is convenient in the following sort of case. A customer question is received on channel #CUSTOMER, and a plurality of responders consider the response contents on channel #SUPPORT, and only the result of their considerations is sent back, and the customer is unaware of the their deliberation chat.

FIGS. 8(a) and (b) show the condition tables for channel #SUPPORT and channel #CUSTOMER. The #SUPPORT condition table in FIG. 8(a) is set to send messages beginning with the keyword "#CUSTOMER" to destination channel #CUSTOMER. On the other hand, the #CUSTOMER condition table in FIG. 8(b) is set so that messages are not sent to destination channel #SUPPORT.

(2) Channel Correlation Information Display

Figure 9:
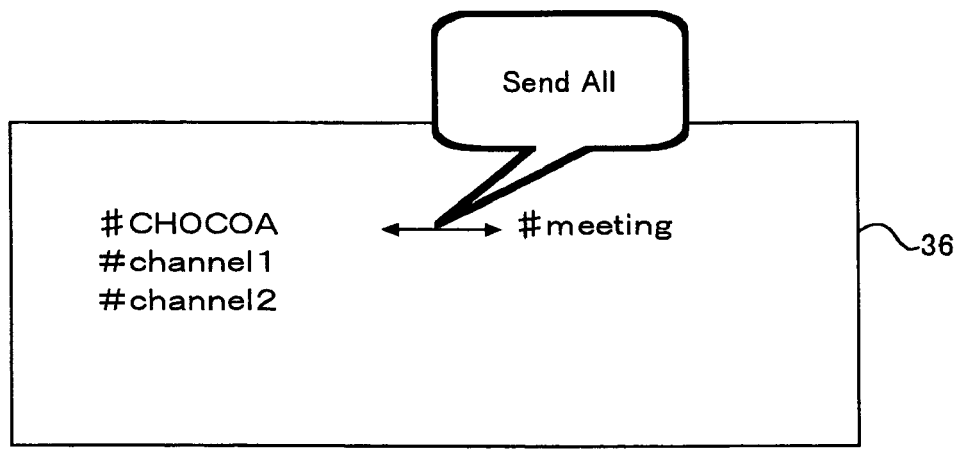
FIG. 9 is examples (a), (b) of display of channel correlation information.
Figure 9:
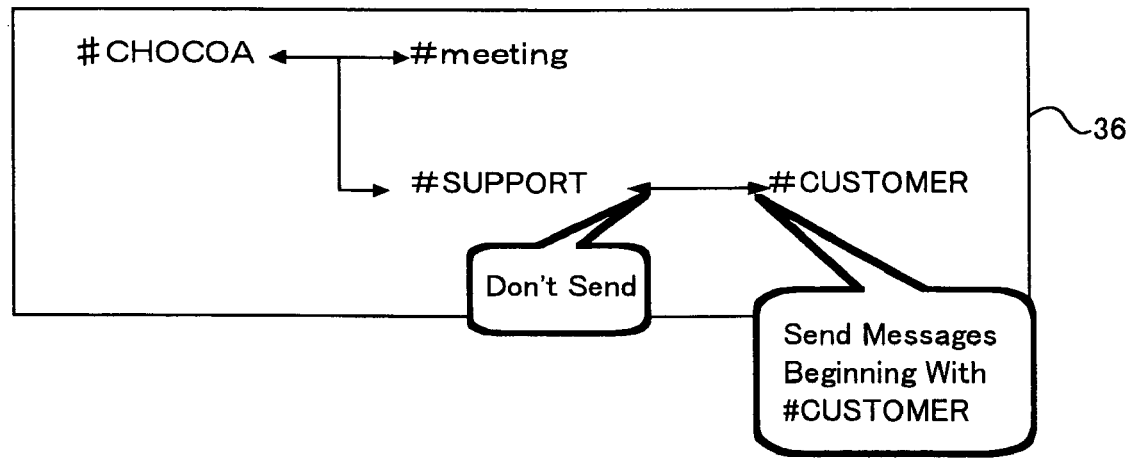

FIG. 9 is the channel window 36 displaying channel correlation information. When the IRC client 2 acquires channel correlation information from the IRC server 1, the channel correlation information is displayed in the channel window 36. FIG. 9(a) is an enlarged view of the channel window 36 in the aforesaid FIG. 5. The relationship between channel #CHOCOA and channel #meeting is displayed in this channel window 36, based on the channel correlation information shown in FIG. 6. For example, if one traces the line between #meeting and #CHOCOA in the direction of #CHOCOA, a balloon is displayed. The balloon describes the condition for sending messages from #meeting to #CHOCOA. Also, when the cursor is brought to #CHOCOA on the line between the two, a balloon describing the condition for sending to #CHOCOA may be displayed.

FIG. 9(b) shows an example of displaying other sending conditions displayed by the correlation display part 22. In FIG. 9(b), the sending conditions are displayed based on the channel correlation information shown in the aforesaid FIG. 8. In this example, bringing a pointing device to the arrow displays the sending conditions in a balloon.

In addition to this, various display formats are possible, such as send origin channel and destination channel being vertically aligned, the relationships between them shown by arrows or lines connecting the two, and the like. In addition to sending conditions, the contents of the hop table may also be displayed. In this case, the IRC client 2 acquires and stores the contents of hop tables for participating channels at appropriate intervals from IRC server 1 and stores them.

Furthermore, channel display is controlled by the correlation display part 22. Specifically, the correlation display part 22 can control so that channels wherein the IRC is not a constituent user are not displayed, based on the sending conditions. For example, in FIG. 9(a) the correlation display part 22 for the IRC client 2 (USER2), which is part of channel #CHOCOA but not part of channel #meeting, does not display channel #meeting.

Also, the correlation display part 22 can also display all relationships between channels regardless of whether or not they are included in users constituting the IRC client 2. Furthermore, in this case it is also possible to display at the same whether or not they the IRC client 2 is included among the constituent users. For example, a channel wherein the IRC client 2 is a user and a channel where it is not a user can be displayed with font color or size or style or the like altered so that they can be distinguished. Operations when one wants to make a message on a displayed channel are the same as the normal procedure for making a sub-channel into the main channel.

Process Flow (1) Server (1-1) Message Send Process

Figure 10:
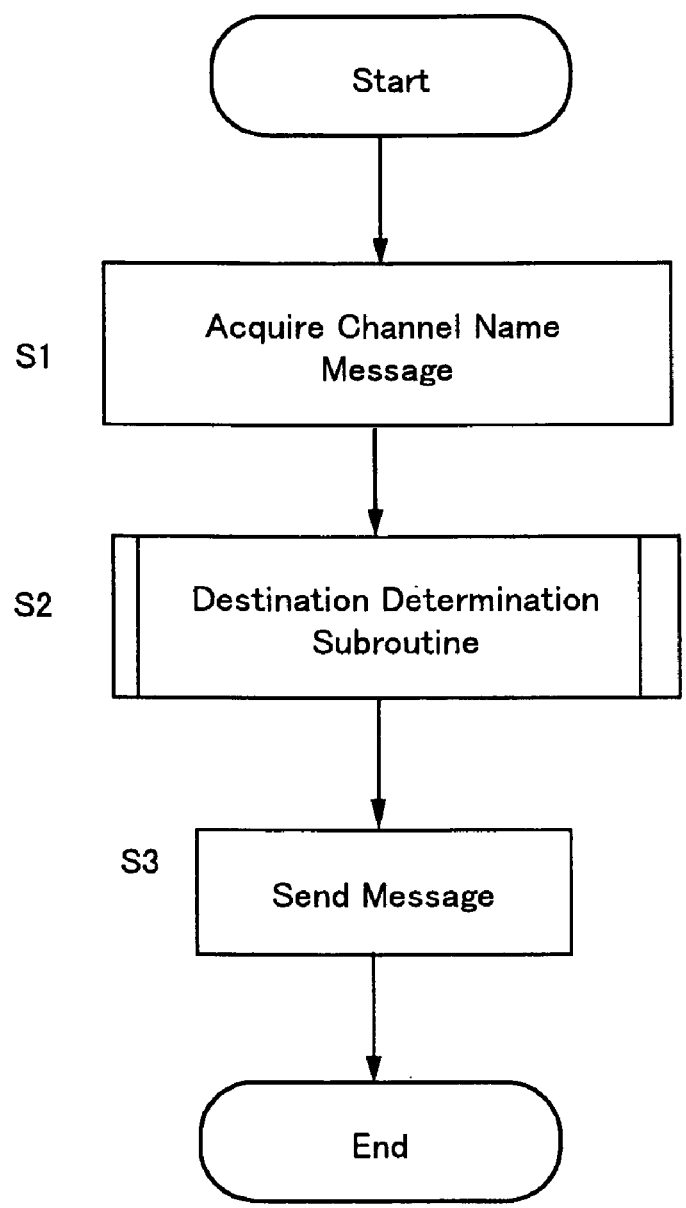
FIG. 10 is a flow chart depicting process flow for message sending.

FIG. 10 is a flow chart showing the processing flow for the IRC server 1 to send a message. When the IRC server 1 receives a message on a channel, the following processing starts. Furthermore, the processing for broadcasting a message to the IRC client 2 within a channel is the same as the normal processing, so explanation thereof shall be omitted.

In step S1, the decision part 12 acquires the message origin channel name and message from received data.

In step S2, the decision part 12 executes a destination determination subroutine to be described later.

In step S3, the sending part 13 sends the message to the destination determined in the aforesaid step S2.

In addition to the aforesaid processing, the IRC server 1 performs processing to send channel correlation information to each IRC client 2. The send timing is when changes occur in the users constituting a channel and when the condition table or hop table are updated.

(1-2) Destination Determination Process

Figure 11:
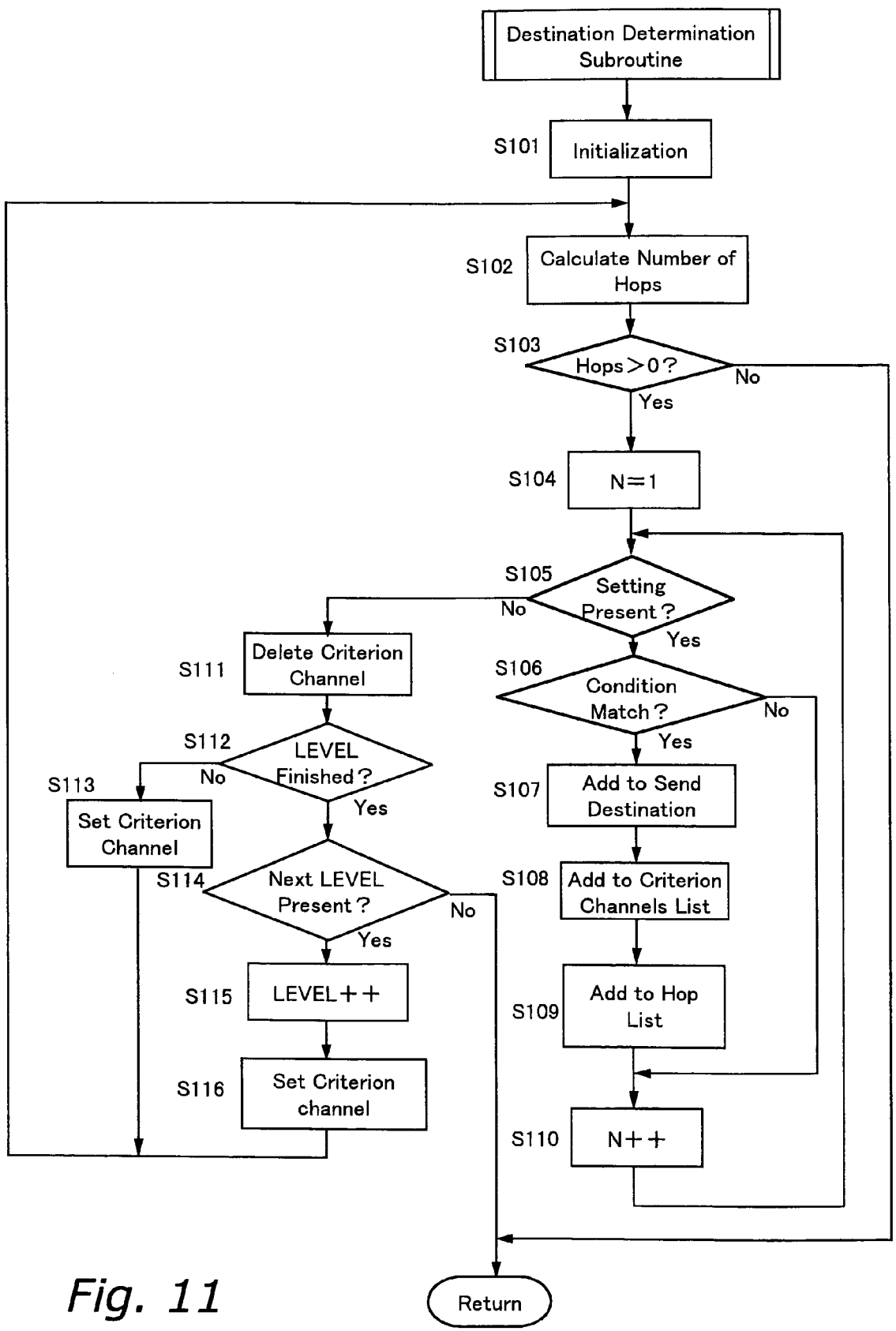
FIG. 11 is a flow chart depicting process flow for determining destination.

FIG. 11 is a flow chart showing the processing flow for destination determination executed in the aforesaid message send processing. When the aforesaid send processing shifts to step S2, the following processing starts.

In step S101, the specified initialization is carried out. For example, variable LEVEL is set to 0. The message origin channel is set to the reference channel. Also, the message origin channel and that LEVEL=0 are correlated and written to the reference channel list. Also, the destination list and hop list are cleared.

Furthermore, LEVEL shall be explained using the aforesaid FIG. 9(b). Message origin channel #CHOCOA is made the reference, i.e. LEVEL=0. The LEVEL of channels #meeting and #SUPPORT, to which messages from channel #CHOCOA are sent directly, is made 1. The LEVEL of #CUSTOMER, to which messages are sent from channel #SUPPORT, is made 2. Below, in the same manner, the destination hierarchy is expressed with the message origin channel as the reference. The reference channel list is a working region used in the course of sequentially following the destination channels from the message origin channel. The destination list is a memory region that temporarily stores destination channel names. The hop list is a region that correlates and stores the send origin and destination and number of hops to the destination (hereinafter "reference hop value").

In step S102 the decision part 12 calculates the new hop number if a message is sent from the reference channel. If the reference channel is the message origin channel, (new hop number)=(initial value)−(reduction value). The reduction value set in the hop table of each reference channel is used as the value for reducing the number of hops.

In step S103 the decision part 12 decides whether or not the found hop number is larger than 0. If yes, the flow moves to step S104. If no, the message is not sent, so the flow returns to the aforesaid message send processing. Furthermore, as described previously, in this embodiment the reference value for the number of hops is 0.

In step S104 the decision part 12 sets variable N=1. "N" represents the entry number in the condition table of the reference channel.

In step S105 the decision part 12 decides whether or not there is a setting for the destination and sending conditions in the $N^{th}$ entry in the reference channel's condition table. If it decides yes, the flow moves to step S106. If it decides no, the flow moves to step S111, to be described later.

In step S106 the decision part 12 decides whether or not the message matches the sending conditions in the $N^{th}$ entry. If it decides yes, the flow moves to step S107. If it decides no, the flow moves to step S110, to be described later, in order to decide about the next entry in the condition table.

In step S107 the decision part 12 writes the destination channel matching the sending conditions to the destination list.

In step S108 the decision part 12 adds the determined channel to the reference channel list as the destination.

In step S109 the decision part 12 writes the reference channel, destination channel, and new hop number to the hop list as send origin, destination, and reference hop value.

In step S110 the decision part 12 increments entry number N. Then the flow returns to the aforesaid step S105, and the previous processing is repeated for the next entry in the condition table.

In step S105, if it is decided that there is no setting for the destination and sending conditions in the $N^{th}$ entry, the flow moves to step S111. In step S111 the decision part 12 deletes the reference channel from the reference channel list. This is because the decision has been made regarding whether or not there is a destination with regard to the destination and sending conditions set in the reference channel's condition table.

In step S112 the decision part 12 decides whether or not the condition tables were checked for all channels having the current LEVEL. This decision is made according to whether or not current LEVEL channels remain in the reference channel list. If the decision is no, the flow moves to step S113. If the decision is yes, the flow moves to step S114, to be described later.

In step S113 the decision part 12 acquires a channel name having the current LEVEL from the reference list and sets it as the reference channel. Then the flow returns to the aforesaid step S102 and the previously described processing repeats.

In step S114 the decision part 12 decides whether or not there is a channel with the next LEVEL. This decision is made according to whether or not channels remain in the reference channel list. If the decision is yes, the flow moves to step S115. If the decision is no, the flow returns to the aforesaid message send processing.

In step S115 the decision part 12 increments the variable LEVEL.

In step S116 the decision part 12 acquires one of the next LEVEL channels from the reference channel list, and sets it as the reference channel. Then the flow returns to the aforesaid step S102.

Figure 12:
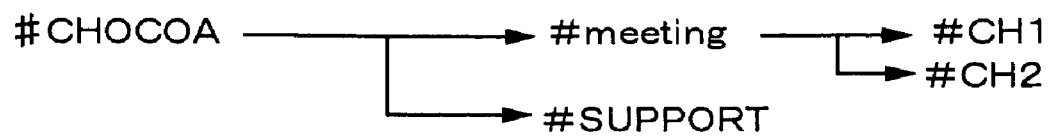
FIG. 12 is a diagram illustrating correlation between channels.

The aforesaid destination determination processing shall be specifically described. To simplify the explanation, channels shall be correlated as shown in FIG. 12. FIG. 12 shows channels #meeting and #SUPPORT set in channel #CHOCOA's condition table as destinations. Also, channels #CH1 and #CH2 are set as destinations in channel #meeting's condition table. The reduction value for the number of hops is set as "3" for all channels. Now, suppose a message originates on channel #CHOCOA and the message matches all the sending conditions.

First, LEVEL=0 is set in initialization (S101), and LEVEL=0 channel #CHOCOA is noted in the reference channel list. Also, channel #CHOCOA is set as the reference channel. If channel #CHOCOA's initial value for the number of hops is 20, the new hop number of a message sent from channel #CHOCOA is 17, which is greater than 0 (S102, S103). Decision part 12 reads the first entry in channel #CHOCOA's condition table (S104).

If the conditions for sending to channel #meeting are w satisfied (S106), channel #meeting is written to the destination list and reference channel list (S107, S108). Also, send origin #CHOCOA, destination #meeting, and reference hop value 17 are correlated and written to the hop list (S109). Similarly, channel #SUPPORT too is written to the destination list, reference channel list and hop list. It is decided that there is no setting at stepN=3 (S105), and reference channel #CHOCOA is deleted from the reference channel list (S111). The reference channel corresponding to LEVEL 0 is only the message origin channel, so LEVEL 0 ends (S112).

Channels #meeting and #SUPPORT are written to the reference channel list (S114), so the LEVEL=1 (S115), and the reference channel is set as channel #meeting (S116).

Next, the new number of hops is calculated for messages sent from LEVEL=1. The reference hop value of reference channel #meeting is 17, so (new hop number)=17−3=14 (S102).

Next, the processing of the aforesaid steps S105 and S110 is repeated for channels #CH1 and #CH2, set as destinations from channel #meeting. The message matches the sending conditions, so both channels #CH1 and #CH2 are added to the destination list, reference channel list, and hop list. Both hop reference values are 14. When N=3 it is decided that there is no setting (S105), and reference channel #meeting is deleted from the reference channel list. However, LEVEL=1 channel #SUPPORT remains on the reference channel list (S112). Therefore channel #SUPPORT is set as the reference channel (S113).

Next, the new number of hops is calculated for reference channel #SUPPORT. The new hop number is 14, so it is written to the first entry of the condition table (S102 through S104). However, #SUPPORT's condition table has no settings (S105). #SUPPORT is deleted from the reference channel list (S111). Now there are no LEVEL=1 channels on the reference channel list, and it is decided that LEVEL 1 has ended (S112).

Next, LEVEL=2 (S115). #CH1 is set as the reference channel (S116). However, channel #CH1's condition table has no settings (S105), so it is deleted from the reference channels (S111). Similarly, channel #CH2 is also deleted from the reference channel list. When channels #CH1 and #CH2 are all deleted from the reference channel list, there is no next LEVEL (S104), so the flow returns to message send processing.

(2) IRC Client 2

Figure 13:
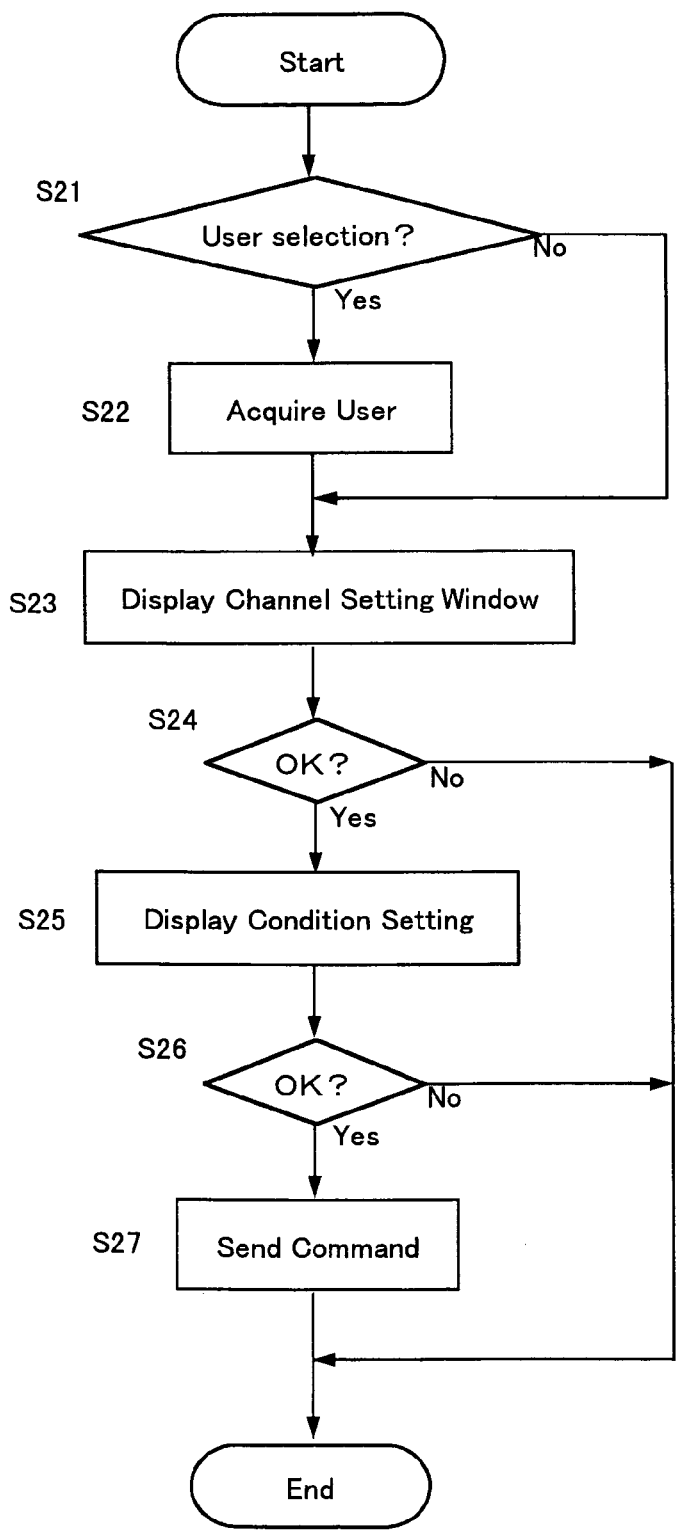
FIG. 13 is a flow chart depicting process flow for correlation information setting.

FIG. 13 is a flow chart showing the processing flow for setting channel correlation information performed by the IRC client 2. Pressing the aforesaid correlation button 37 starts the following processing.

First, in step S21 the setting part 21 decides whether or not a user has been selected in user window 35. If the decision is yes, the flow moves to step S22. If the decision is no, the flow moves to step S23, to be described later.

In step S22 the setting part 21 acquires the selected user's nickname.

In step S23 the setting part 21 displays the "channel setting window" in FIG. 4(a) and receives the setting for the destination channel.

In step S24 the setting part 21 waits until any button is pressed, and if the "OK button" is pressed, the flow moves to step S25. If the "cancel button" is pressed, processing ends.

In step S25 the setting part 21 displays the "condition setting window" in FIG. 4(b) and receives the settings for sending conditions.

In step S26 the IRC client 2 waits until any button is pressed, and if the "OK button" is pressed, the flow moves to step S27. If the "cancel button" is pressed, processing ends.

In step S27 the setting part 21 creates the setting command and sends it to IRC server 1. Described in the setting command are the send origin channel name, destination channel name, and sending conditions.

Furthermore, in addition to the aforesaid setting processing, correlation display part 22 at the IRC client 2 receives and stores participating channel condition tables from IRC server 1. Also, correlation display part 22 displays the contents of the stored condition tables.

Second Embodiment

Figure 14:
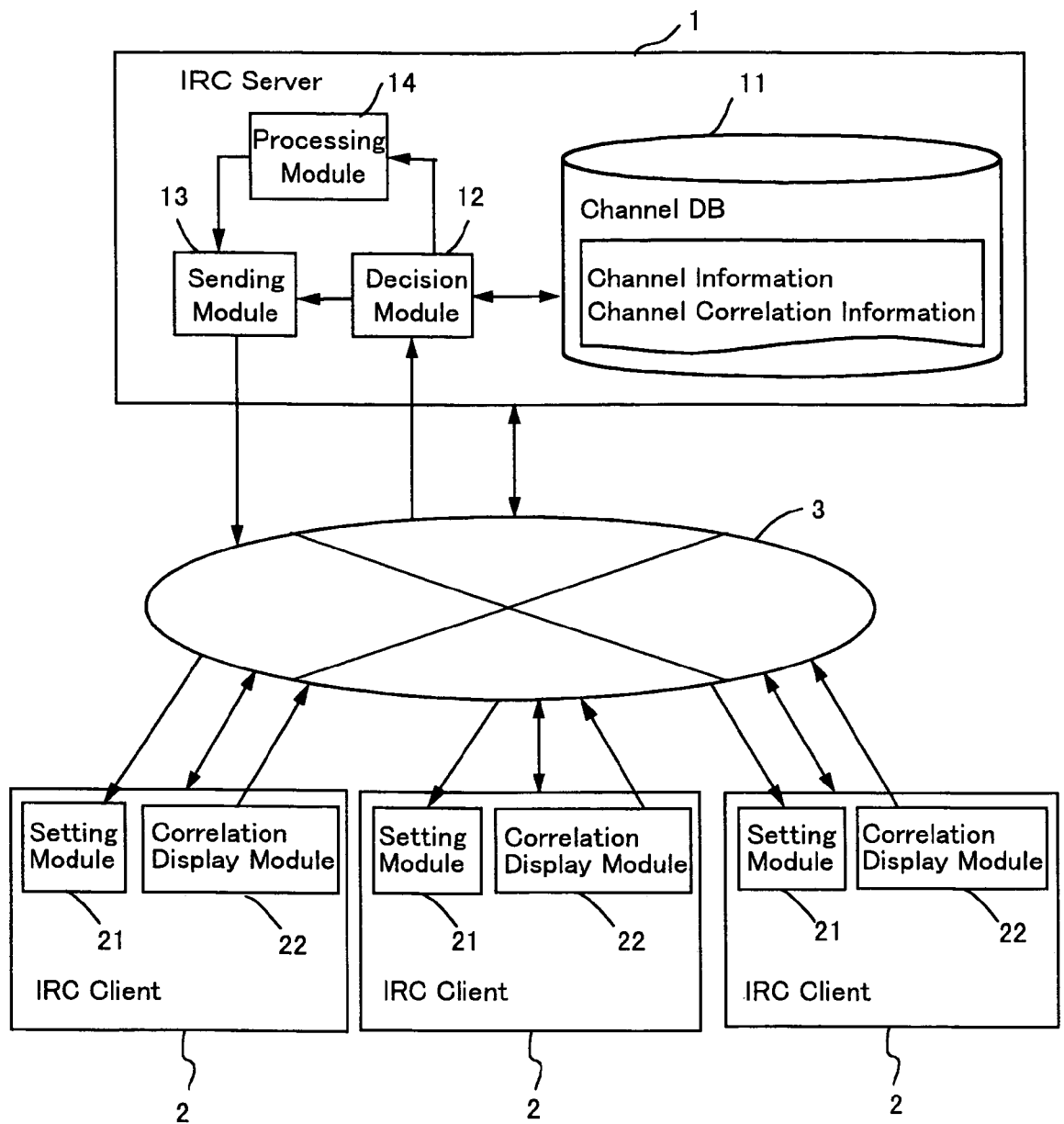
FIG. 14 is an overall structural view of a chat system in accordance with a second embodiment of the present invention.

Next, a second embodiment of the present invention shall be explained with reference to drawings. FIG. 14 is an overall structural drawing of a chat system in accordance with the second embodiment of the present invention. As with the aforesaid first embodiment, FIG. 14 shows an example of the present invention applied to an IRC system. The chat system in FIG. 14 has the same structure as the aforesaid first embodiment, except that a processing part 14 is added to the IRC server.

Server

The IRC server 1 manages channel information and channel correlation information in the same way as in the first embodiment. However, it differs from the first embodiment in that a processing condition is added to the channel correlation information. In addition, the processing part 14 is added to the IRC server 1 in addition to the decision part 12 and the sending part 13.

FIG. 15 is a diagram schematically illustrating the channel correlation information held in the channel DB 11. The IRC server 1 has a condition table and hop table as channel correlation information for each channel. The hop table has the same structure as in the first embodiment. The condition table, in addition to send origin channel name, destination channel name, sending conditions, and display format, correlates and stores processing conditions. The sending conditions and display format are the same as in the first embodiment.

The "processing conditions" describe how the sent message is processed. In this figure "add channel name," "respond with representative name," and "change font" are respectively designated, depending on the destination.

The decision part 12, in the same way as in the first embodiment, determines the destination of a message occurring within a channel. Furthermore, the decision part 12 reports both the message contents and destination determined to have a processing condition to the processing part 14. Updating the condition table and reporting channel correlation information are performed by the decision part 12 in the same way as in the first embodiment.

The processing part 14 processes message contents reported by the decision part 12 according to the processing conditions and reports to the sending part 13.

The sending part 13 sends the processed message contents to the destination channel. Also, the sending part 13 reports channel correlation information to the IRC client 2 in accordance with the decision part 12's report.

IRC Client

Figure 16:
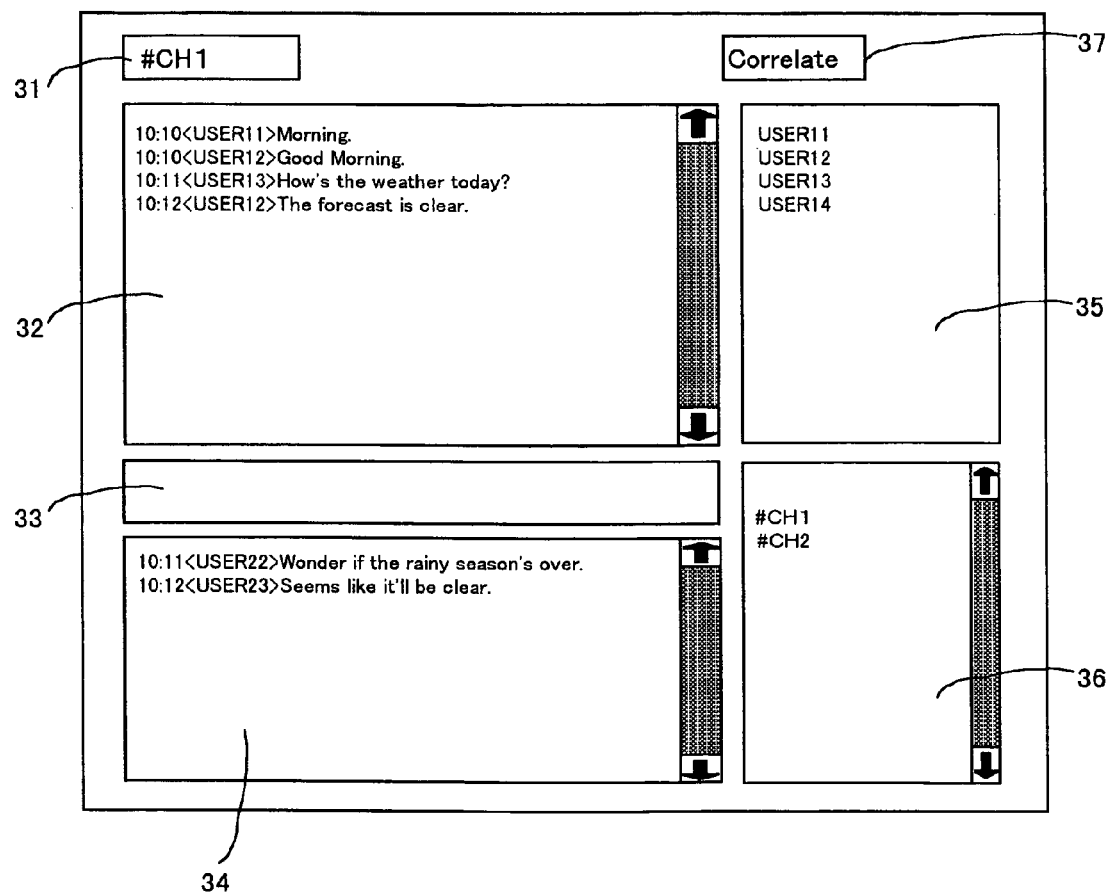
FIG. 16 is a display example wherein messages are not sent.

The IRC client 2 has the same functions as in the aforesaid first embodiment. That is, the setting part 21 receives settings for the aforesaid channel correlation information, and sends the setting contents to the IRC server 1. The correlation display part 22 receives the specified channel information and channel correlation information from the IRC server 1 and controls its display. Screen (1) Setting Channel Correlation Information Next, an example of processing a sent message and of setting processing condition shall be explained. FIG. 16 is an example of a chat screen, displayed by the IRC client 2, before sending a message. Displayed on the screen are the main channel window 31, the main chat window 32, the input window 33, the sub-chat window 34, the user window 35, the channel window 36, and the correlation button 37. These windows and buttons have the same functions as in the first embodiment.

At present, the IRC client 2 is participating in the two channels #CH1 and #CH2, with #CH1 as the main channel and #CH2 as the sub-channel. Users USER11, USER12, USER13, USER14 and USER15 [sic] are participating in main channel #CH1. The chats on main channel #CH1 and sub-channel #CH2 are respectively displayed in main chat window 32 and sub-chat window 34.

Figure 17:
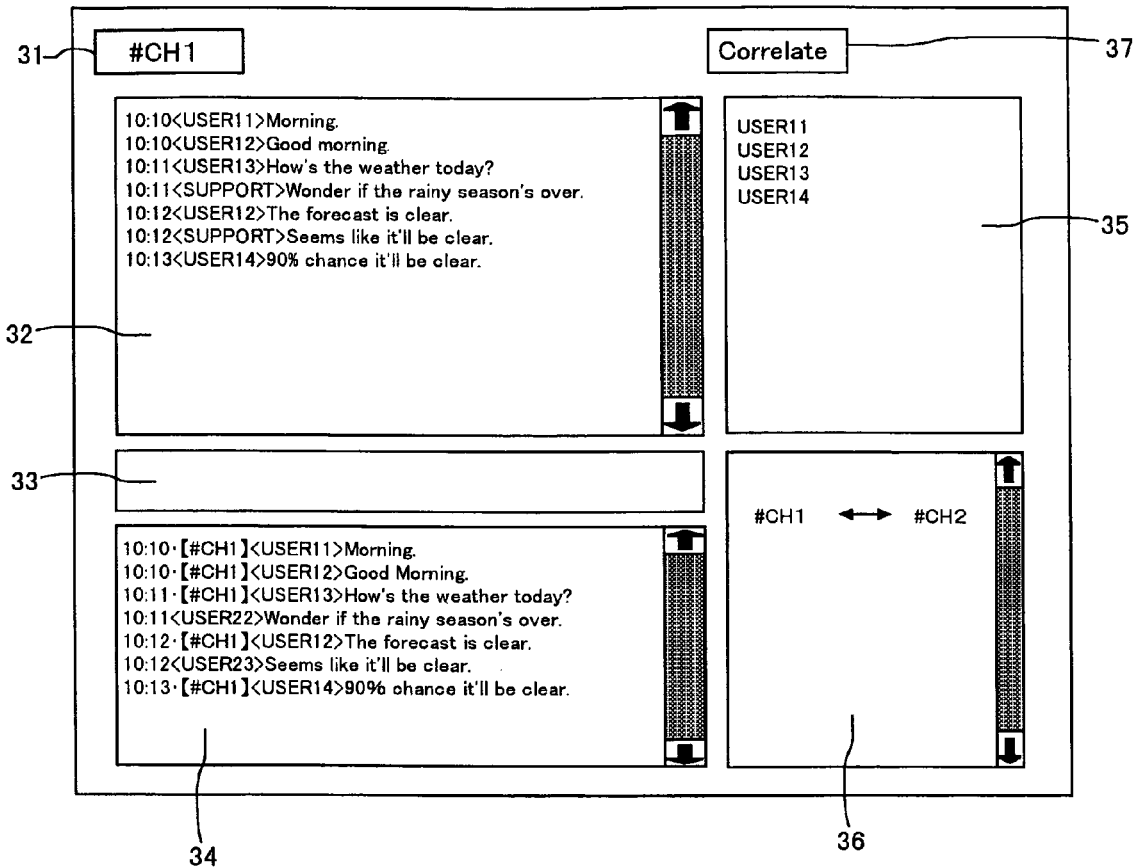
FIG. 17 is an example of sent message processing.

FIG. 17 is an example of the message display on each channel when all messages are sent in both directions to channels #CH1 and #CH2. On channel #CH1, messages from #CH2 are all displayed as messages sent from the nickname "SUPPORT" (see main chat window 32). On channel #CH2, all messages from channel #CH1 are displayed with the channel name [#CH1] inserted at the start (see sub-chat window 34). Furthermore, channel correlation information is displayed in the same way as in the first embodiment.

Figure 18:
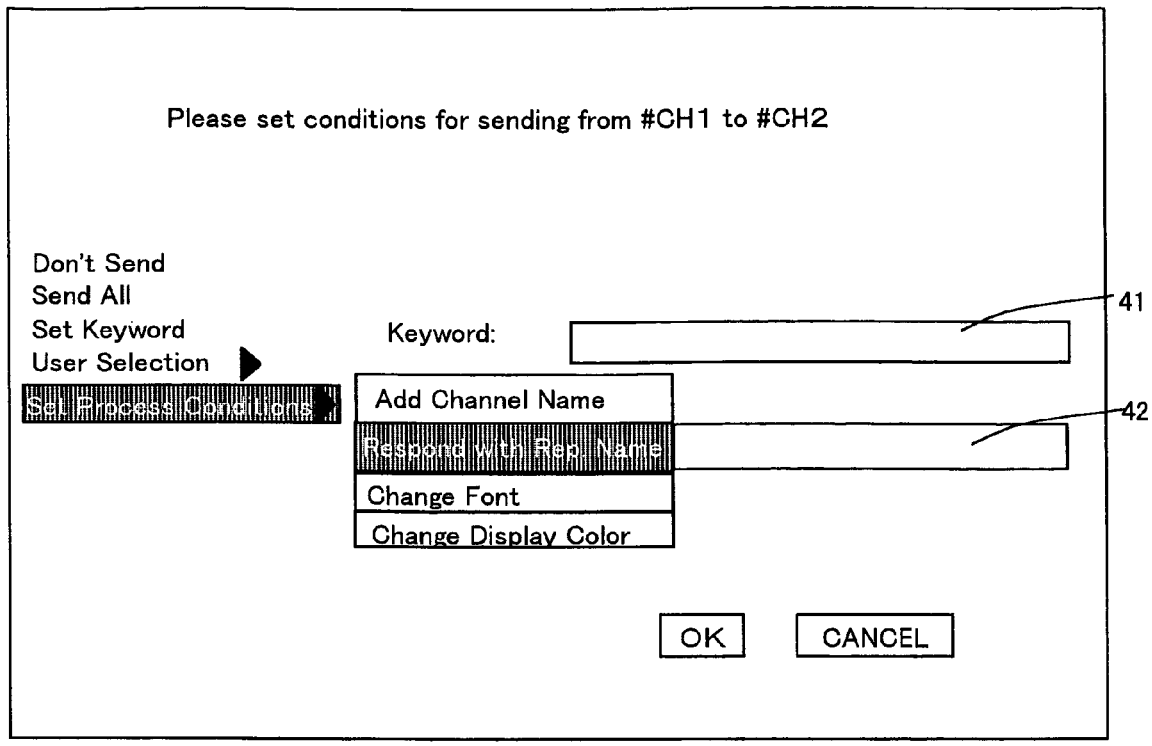
FIG. 18 is an example window of process condition setting.

FIG. 18 shows an example of the "condition setting window" displayed in the second embodiment. This window is equivalent to FIG. 4(b) in the first embodiment, and differs from FIG. 4(b) by receiving settings for processing conditions. In the same way as in the first embodiment, when correlation button 37 is pressed and the send origin and destination channels are set in FIG. 4(a)'s "channel setting window" and the "OK button" is pressed, FIG. 18's condition setting window is displayed.

In addition to the conditions for sending messages from channel #CH1 to channel #CH2, message processing conditions are also set in this "condition setting window." Sending condition settings can be selected and set as "don't send," "send all," "set keyword," and "user selection" in the same way as in the first embodiment.

When "set processing conditions" is selected, a list of processing conditions is displayed in a pulldown menu. In the example shown in the drawing, a user can select "add channel name," "respond with representative name," "change font," and "change display color." If "respond with representative name" is selected as shown in the drawing, field 42 is displayed for receiving input of the representative name. Also, if either "change font" or "change color" is selected, a pulldown menu for selecting settable fonts or display colors is displayed (not shown in drawing).

When the "OK button" is pressed in FIG. 18, a setting command is sent from the IRC client 2 to IRC server 1. In addition to the send origin channel, destination channel, and sending conditions, the setting command also describes the processing conditions. Here are examples of the setting commands in this case.

"RELATION #CH1 #CH2 CONTENT* CHANNEL"

The aforesaid setting command is a setting command for sending all messages on channel #CH1 to existing channel #CH2 with the channel name added at the head.

"RELATION #CH2 #CH1 CONTENT* REPRESENTATIVE (SUPPORT)"

The aforesaid setting command is a setting command for sending all messages on channel #CH2 to existing channel #CH1 as messages from representative name "SUPPORT".

FIG. 19 shows the condition tables for channels #CH1 and #CH2 when transferring messages between channels #CH1 and #CH2 shown in FIG. 17. Channel #CH1's condition table describes "add channel name" to the message as the processing condition. Also, channel #CH2's condition table describes "respond with representative name SUPPORT" as the processing condition. Also, both tables set sending all messages as the sending condition.

Furthermore, something not shown in the drawing is that if "change font" or "change display color" is selected as the processing condition, the selected font or display color is stored in the condition table.

Process Flow (1) Server (1-1) Message Send Processing

Figure 20:
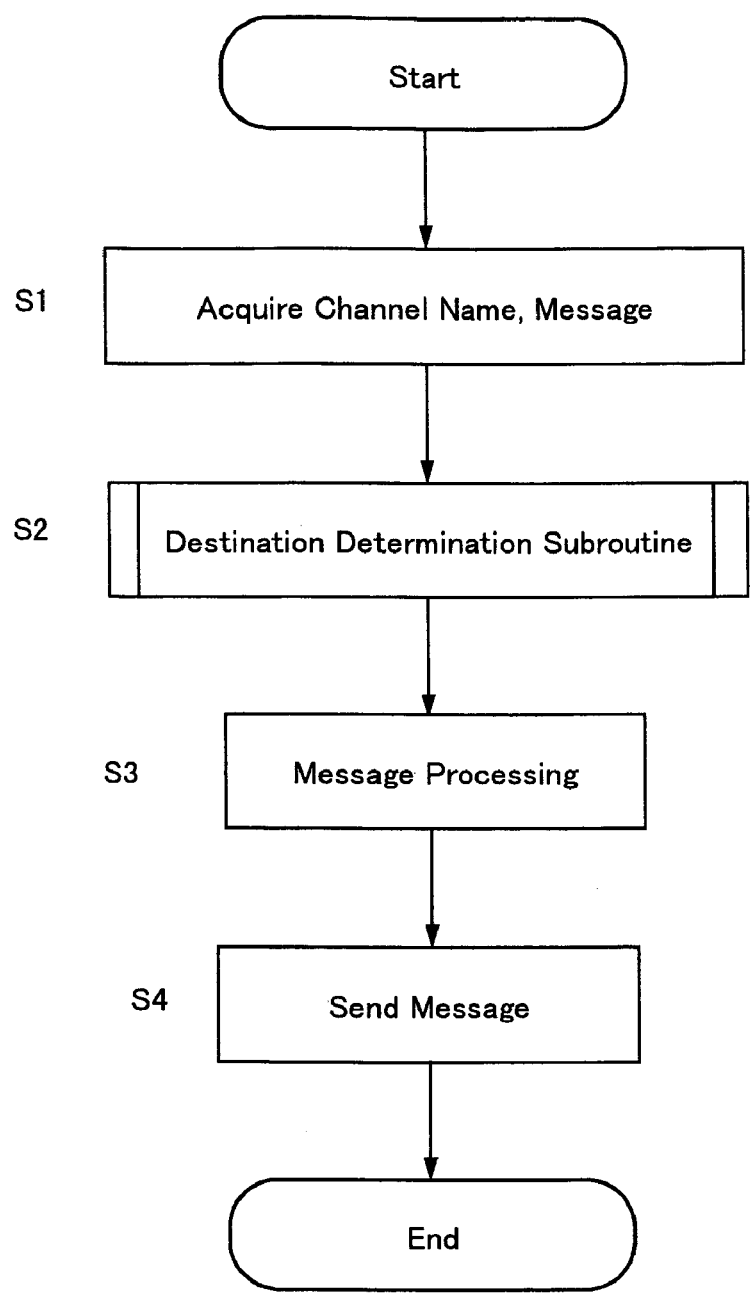
FIG. 20 is a flow chart depicting process flow when sending messages (second embodiment)

FIG. 20 is a flow chart showing the flow of processing for sending messages performed by IRC server 1. When IRC server 1 receives a message on any channel the following processing begins. Furthermore, the processing for broadcasting a message to the IRC client 2 within a channel is the same as the normal processing, so explanation thereof shall be omitted.

In step S1, the decision part 12 acquires the message origin channel name and message from received data.

In step S2, the decision part 12 executes the destination determination subroutine described earlier. In the same way as in the first embodiment, the destination determination subroutine determines the destination by deciding whether or not a message matches the sending conditions and whether or not a message's number of hops satisfies the reference value.

In step S3 the processing part 14 processes the message in accordance with the processing conditions. A message undergoes individualized processing for each destination in accordance with the processing conditions set for each destination. If "add channel name" is set, the send origin channel name is added to the head of the message. If "respond with representative name" is set, the nickname of the message originator is replaced with the designated representative name. If "change font" is set, the message is rewritten in the designated font. If "change display color" is selected, the message is rewritten in the designated display color.

In step S4 the sending part 13 sends the processed message to the destination determined in the aforesaid step S2.

In the aforesaid processing, the sending by IRC server 1 of channel correlation information to each IRC client 2 is the same as in the first embodiment.

(2) IRC Client

The IRC client 2 processes settings for the channel correlation information shown in the aforesaid FIG. 13 in the same way as in the first embodiment. That is, as instructed by the user, it displays the channel setting window in FIG. 4(a) or the condition setting window in FIG. 18. It also receives input to these windows and sends commands describing the input contents to the IRC server 1.

Furthermore, in addition to the aforesaid setting processing, receiving from the IRC server 1 condition tables for channels in which the IRC client 2 is participating and displaying condition table contents is the same as in the first embodiment.

Other Embodiments (A) In the aforesaid embodiments the channel correlation information was put in the IRC server 1, but it can also be put in the IRC client 2. In this case, the IRC client 2 sends a message input on a channel to that channel, and refers to that channel's condition table to determine the destination. Next, it sends the input message to the destination channel. The processing to determine the destination channel is the same as the destination determination processing in the aforesaid FIG. 11. If message sending is performed by the IRC client 2, it is possible to build a chat system that does not use an IRC server.

Figure 21:
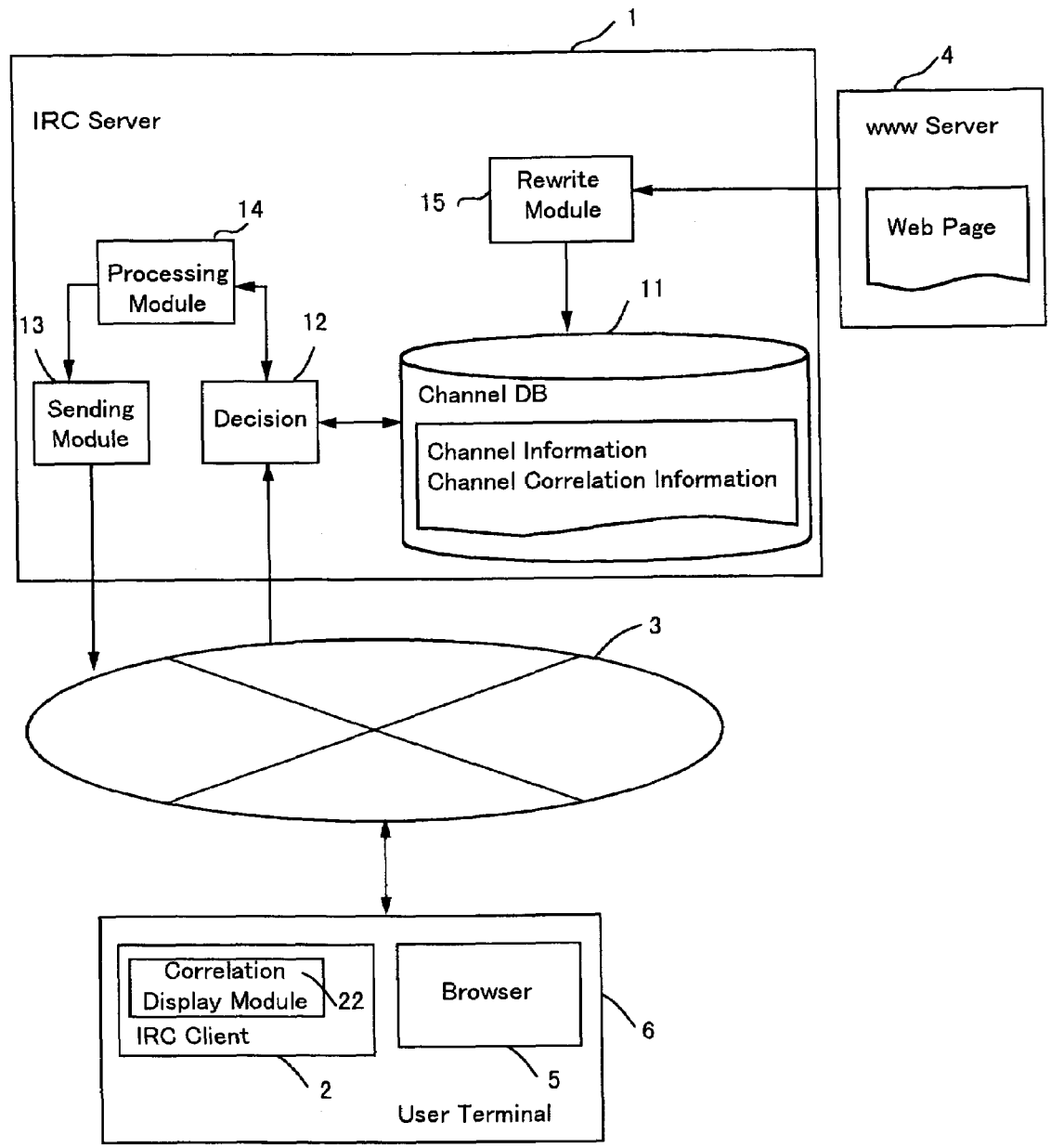
FIG. 21 is a system structural example wherein a setting module is not provided in the IRC client.

(B) In the aforesaid embodiments, the setting part 21 was provided in the IRC client in order to change the condition table. However, it is also possible to change the condition table using an existing application. FIG. 21 is a structural diagram of a chat system in which a condition table is changed using a WWW server and browser.

A web page for inputting sending conditions or processing conditions is prepared on a WWW server in advance. A user accesses the web page using a browser 5 on a user terminal 6, and sets conditions. This web page (not shown in the drawing) is equivalent to the setting windows in FIG. 4 or FIG. 18.

A rewrite part 15 is provided in the IRC server. Contents set at the web page are sent to the rewrite part 15, and written to the condition table in the channel DB 11 by rewrite part 15. In this way, simply by providing the rewrite part 15 in the IRC server 1, it becomes possible for a user to rewrite a condition table on the IRC server.

(C) The aforesaid embodiments were explained with examples in which IRC was used as the chat system. However, the present invention can also be applied to other chat systems besides IRC. These include Webchat, Nifty Forum, etc., for example.

(D) The storage medium storing the program that executes the previously described inventive method is included in the present invention. Examples of the storage medium include computer readable and writable floppy disks, hard disks, semiconductor memories, CD-ROM, DVD, magneto-optical disks (MO), and the like.

(E) The transmission medium transmitting the program that executes the previously described inventive method is included in the present invention. Examples of this transmission medium include transmission media (optical fiber, wireless circuits, etc.) in computer network systems (LAN, Internet, wireless communication network) for propagating and supplying program information as a carrier.

When chat messages concerning a plurality of subjects occur on a computer network shared by a plurality of users, the present invention makes it possible to separate chats by each topic and moreover to share chats regarding a plurality of topics as needed while chatting on a text basis without confusion. Moreover, by modifying messages as needed, it is possible to optimize the display at the destination.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A chat sending method employed in a chat system for enabling a conference communication between users sharing an identical network, and for content display of chat on the network, the chat sending method comprising:
   correlating and storing send conditions for filtering and forwarding messages in a first virtual space shared by a first user group in the chat system to a second virtual space shared by a second user group in the chat system;
   deciding based on the send conditions whether to forward a message to the second virtual space shared by the second user group after the message is received in the first virtual space shared by the first user group in the chat system; and
   forwarding the message received in the first virtual space to the second virtual space in accordance with the decision; and wherein of the messages in the first virtual space, only the message matching the send conditions is forwarded and displayed as chat content of the second virtual space to enable the conference communication.

2. A chat system for a conference communication between information terminals sharing an identical network, and for content display of chat on the network, the chat system comprising:
   a conditions table for correlating and storing send conditions for filtering and forwarding messages in a first virtual space shared by a first user group in the chat system to a second virtual space shared by a second user group in the chat system;
   decision means for deciding based on contents of said conditions table whether a message on the first virtual space should be forwarded to the second virtual space shared by the second user group after the message is received in the first virtual space shared by the first user group in the chat system; and
   forwarding means for forwarding the message received in the first virtual space to the second virtual space in accordance with the decision; and wherein of the messages received in the first virtual space, only the message matching the send conditions is forwarded and displayed as chat content in the second virtual space to enable the conference communication.

3. The chat system set forth in claim 2, further comprising setting means for accepting and recording in said conditions table condition settings on forwarding messages between the first user group and the second user group.

4. The chat system set forth in claim 2, wherein inclusion of designated keywords in the messages is a send condition.

5. The chat system set forth in claim 2, wherein there being messages from a designated information terminal is a send condition.

6. The chat system set forth in claim 2, wherein a holding score and a holding-score reduction value are set for messages on the networks, and a send condition is a fresh holding point a predetermined criterion value and above, found by reducing the holding points for a message by just the reduction value.

7. The chat system set forth in claim 2, wherein the send condition is there being a message within a designated time period.

8. The chat system set forth in claim 2, wherein a message send-origin and send-destination designation is included in the send conditions.

9. The chat system set forth in claim 2, further comprising:
   a process conditions table for storing process conditions for forwarding messages from the first user group to the second user group; and
   processing means for processing messages forwarded in accordance with the process conditions.

10. The chat system set forth in claim 2, further comprising process-setting means for accepting and recording in storage means settings on message process conditions.

11. The chat system set forth in claim 2, wherein said information terminal comprises output means for outputting conditions on forwarding messages in between the networks.

12. A signal distribution device for broadcasting messages from chat devices to enable a conference communication by sharing an identical network with one another and for content display of chat on the network, to other chat devices within the network, the signal distribution device comprising:
   a conditions table for correlating and storing send conditions for filtering and forwarding messages in a first virtual space shared by a first user group in a chat system to a second virtual space shared by a second user group in the chat system;
   decision means for deciding based on contents of said conditions table whether a message on the first virtual space should be forwarded to the second virtual space shared by the second user group after the message is received in the first virtual space shared by the first user group in the chat system; and
   forwarding means for forwarding the message received in the first virtual space to the second virtual space in accordance with the decision; and wherein of the messages received in the first virtual space, only the message matching the send conditions is forwarded and displayed as chat content of the second virtual space to enable the conference communication.

13. A chat device to enable mutual conference communications by sharing an identical network and for content display of chat on the network, the chat device comprising:
   a conditions table for correlating and storing send conditions for filtering and forwarding messages in a first virtual space shared by a first user group in a chat system to a second virtual space shared by a second user group in the chat system;
   decision means for deciding, based on contents of said conditions table, whether a message on the first virtual space should be forwarded to the second virtual space shared by the second user group after the message is received in the first virtual space shared by the first user group in the chat system; and
   forwarding means for forwarding the message received in the first virtual space to the second virtual space in accordance with the decision; and wherein of the messages received in the first virtual space, only the message matching the send conditions is forwarded and displayed as chat content of the second virtual space to enable the conference communications.

14. A computer readable storage medium having a chat control program employed in signal distribution devices for broadcasting messages from chat devices to enable a conference communication by sharing an identical network with one another and for content display of chat on the network, to other chat devices within the network, the computer readable storage medium wherein is recorded a chat control program for executing:

correlating and storing send conditions for filtering and forwarding messages in a first virtual space shared by a first user group in a chat system to a second virtual space shared by a second user group in the chat system;

deciding based on contents of said conditions table whether a message on the first virtual space should be forwarded to the second virtual space shared by the second user group after the message is received in the first virtual space shared by the first user group in the chat system; and forwarding the message received in the first virtual space to the second virtual space in accordance with the decision; and wherein of the messages received in the first virtual space, only the message matching the send conditions is forwarded and displayed as chat content of the second virtual space to enable the conference communication.

15. A computer readable storage medium wherein is recorded a chat control program employed in chat devices to enable mutual conference communications by sharing an identical network and for content display of chat on the network, the computer readable storage medium wherein is recorded a chat control program for executing:

correlating and storing send conditions for filtering and forwarding messages in a first virtual space shared by a first user group in a chat system to a second virtual space shared by a second user group in the chat system;

deciding based on contents of said conditions table whether a message on the first virtual space should be forwarded to the second virtual space shared by the second user group after the message is received in the first virtual space shared by the first user group in the chat system; and forwarding the message received in the first virtual space to the second virtual space in accordance with the decision; and wherein of the messages received in the first virtual space, only the message matching the send conditions is forwarded and displayed as chat content of the second virtual space to enable the conference communications.

16. A chat sending method in a chat system for selectively sending messages to enable a conference communication, comprising:

correlating and storing send conditions for filtering and forwarding messages in a first virtual space shared by a first user group in the chat system to a second virtual space shared by a second user group in the chat system;

deciding based on the send conditions whether to forward the message to the second virtual space shared by the second user group after the message is received in the first virtual space shared by the first user group in the chat system; and forwarding the message received in the first virtual space to the second virtual space in accordance with the decision; and wherein of the messages received in the first virtual space, only the message matching the send conditions is forwarded and displayed as chat content of the second virtual space to enable the conference communication.

17. A chat sending method of a chat system for selectively sending messages to enable a conference communication, comprising:

correlating and storing send conditions for filtering and forwarding messages in a first virtual space shared by a first user group in a chat system to a second virtual space shared by a second user group in the chat system;

determining whether messages received in the first virtual space shared by the first user group match send conditions for forwarding messages after the messages are received in the first virtual space shared by the first user group in the chat system; and forwarding a message among said messages received in the first virtual space in the chat system to the second virtual space shared by the second user group in the chat system based on the determining; wherein of the messages received via the first virtual space, only the message matching the send conditions is forwarded and displayed as chat content of the second virtual space to enable the conference communication.

18. A chat sending method for processing messages to enable a conference communication, comprising:

correlating and storing send conditions for filtering and forwarding messages in a first virtual space shared by a first user group in a chat system to a second virtual space shared by a second user group in the chat system;

determining whether messages received via a the first virtual space shared by the first user group match send conditions for forwarding the messages after the messages are received in the first virtual space shared by the first user group in the chat system; and forwarding a message among said messages received in the first virtual space to the second virtual space shared by the second user group of a chat system based on the determining; wherein of the messages received in the first virtual space only the message matching the send conditions is forwarded and displayed as chat content of the second virtual space during the conference communication.

19. A chat sending method of a chat system for selectively sending messages to enable a conference communication, comprising:

correlating and storing send conditions for filtering and forwarding messages in a first virtual space shared by a first user group in the chat system; to a second virtual space shared by a second user group in the chat system;

filtering messages residing on the first virtual space shared by the first user group based on send conditions for forwarding the messages after the messages are received in the first virtual space, said filtering including determining whether to forward said messages; and forwarding a message among said messages received in the first virtual space to the second virtual space shared by the second user group in accordance with the filtering; wherein of the messages residing on the first virtual space, only the message matching the send conditions is forwarded and displayed as chat content of the second virtual space to enable the conference communication.

20. A chat sending method of a chat system for selectively sending messages in real-time, comprising:

correlating and storing send conditions for filtering and forwarding messages in a first virtual space shared by a first user group in the chat system to a second virtual space shared by a second user group in the chat system;

determining whether messages sent to the first virtual space shared by the first user group of the chat system match send conditions for forwarding the messages after the messages are received in the first virtual space shared by the first user group in the chat system; and forwarding a message among said messages received in the first virtual space in real-time to the second virtual space shared by the second user group in accordance with the determination; wherein of the messages sent to the first virtual space, only the message matching the send conditions is forwarded and displayed as chat content of the second virtual space.

21. A chat sending method of a chat system for selectively sharing messages related to conference communications, comprising:

correlating and storing send conditions for filtering and forwarding messages in a first virtual space shared by a first user group in the chat system to a second virtual space shared by a second user group in the chat system;

determining whether messages exchanged between participants using the first virtual space shared by the first user group match the send conditions for forwarding the messages, said messages being received in the first virtual space of the chat system; and forwarding a message among said messages that match the send conditions to participants using the second virtual space shared by the second user group of the chat system, and displaying the message sent as chat content of the second virtual space.

22. A chat sending method for selectively sharing messages related to conference communications, comprising:

correlating and storing send conditions for filtering and forwarding instant messages in a first virtual space shared by a first user group in a chat system to a second virtual space shared by a second user group in the chat system;

filtering through instant messages received in the first virtual space shared by the first user group and determining whether an instant message among the instant messages on the first virtual space meets the send conditions for forwarding said instant message subsequent to transmission of the instant message to the first virtual space from an original sender; and forwarding a copy of the instant message to the second virtual space shared by the second user group upon determining that the instant message meets the send conditions, where said copy of the instant message is forwarded and displayed as chat content on the second virtual space of a chat system to enable a conference communication.

* * * * *

UNITED STATES PATENT AND TRADEMARK OFFICE
CERTIFICATE OF CORRECTION

| | |
|---|---|
| PATENT NO. | : 7,426,540 B1 |
| APPLICATION NO. | : 09/563389 |
| DATED | : September 16, 2008 |
| INVENTOR(S) | : Yasuhide Matsumoto et al. |

Page 1 of 1

It is certified that error appears in the above-identified patent and that said Letters Patent is hereby corrected as shown below:

Column 22, Line 29, after "via" delete "a".

Column 22, Line 36, change "a" to --the--.

Signed and Sealed this

Thirteenth Day of January, 2009

JON W. DUDAS
*Director of the United States Patent and Trademark Office*